(12) United States Patent
Wang et al.

(10) Patent No.: US 10,990,803 B2
(45) Date of Patent: Apr. 27, 2021

(54) KEY POINT POSITIONING METHOD, TERMINAL, AND COMPUTER STORAGE MEDIUM

(71) Applicant: Tencent Technology (Shenzhen) Company Limited, Shenzhen (CN)

(72) Inventors: Chengjie Wang, Shenzhen (CN); Jilin Li, Shenzhen (CN); Yandan Zhao, Shenzhen (CN); Hui Ni, Shenzhen (CN); Yabiao Wang, Shenzhen (CN); Ling Zhao, Shenzhen (CN)

(73) Assignees: TENCENT TECHNOLOGY (SHENZHEN), Shenzhen (CN); COMPANY LIMITED, Shenzhen (CN)

( * ) Notice: Subject to any disclaimer, the term of this patent is extended or adjusted under 35 U.S.C. 154(b) by 97 days.

(21) Appl. No.: 16/222,941

(22) Filed: Dec. 17, 2018

(65) Prior Publication Data

US 2019/0138791 A1 May 9, 2019

Related U.S. Application Data

(63) Continuation-in-part of application No. PCT/CN2017/096229, filed on Aug. 7, 2017.

(30) Foreign Application Priority Data

Aug. 10, 2016 (CN) .......................... 201610654125.5

(51) Int. Cl.
*G06K 9/00* (2006.01)
*G06K 9/62* (2006.01)

(52) U.S. Cl.
CPC ..... *G06K 9/00248* (2013.01); *G06K 9/00255* (2013.01); *G06K 9/00281* (2013.01); *G06K 9/6256* (2013.01)

(58) Field of Classification Search
CPC .......... G06K 9/00248; G06K 9/00255; G06K 9/00281; G06K 9/6256; G06K 9/4671;
(Continued)

(56) References Cited

U.S. PATENT DOCUMENTS

| 8,254,647 B1 * | 8/2012 | Nechyba ............ G06K 9/00248 |
| | | 382/118 |
| 2008/0037836 A1 | 2/2008 | Chen et al. | |
| 2016/0283820 A1 * | 9/2016 | Shen .................. G06K 9/00281 |

FOREIGN PATENT DOCUMENTS

| CN | 102254151 A | 11/2011 |
| CN | 103295015 A | 11/2013 |

(Continued)

OTHER PUBLICATIONS

Tencent Technology, ISRWO, PCT/CN2017/096229, dated Oct. 27, 2017, 7 pgs.

(Continued)

*Primary Examiner* — Jianxun Yang
(74) *Attorney, Agent, or Firm* — Morgan, Lewis & Bockius LLP

(57) ABSTRACT

When a target image is captured, the device provides a portion of the target image within a target detection region to a preset first model set to calculate positions of face key points and a first confidence value. The face key points and the first confidence value are output by the first model set for a single input of the portion of the first target image into the first model set. When the first confidence value meets a first threshold corresponding to whether the target image is a face image, the device obtains a second target image corresponding to the positions of the first face key points; the device inputs the second target image into the first model set to calculate a second confidence value, the second confidence value corresponds to accuracy key point positioning, and (Continued)

outputs the first key points if the second confidence value meets a second threshold.

20 Claims, 15 Drawing Sheets

(58) Field of Classification Search
CPC .... G06K 9/6255; G06K 9/6211; G06K 9/036; G06K 9/228; G06K 9/009122
See application file for complete search history.

(56) References Cited

FOREIGN PATENT DOCUMENTS

| | | | |
|---|---|---|---|
| CN | 104715227 | A | 6/2015 |
| CN | 105320921 | A | 2/2016 |
| CN | 105426870 | A | 3/2016 |
| CN | 106295567 | A | 1/2017 |
| WO | WO 2010035918 | A1 | 4/2010 |

OTHER PUBLICATIONS

Tencent Technology, IPRP, PCT/CN2017/096229, dated Feb. 12, 2019, 6 pgs.

* cited by examiner

KEY POINT POSITIONING METHOD, TERMINAL, AND COMPUTER STORAGE MEDIUM

PRIORITY CLAIMS AND RELATED APPLICATIONS

This application is a continuation-in-part application of PCT application number PCT/CN2017/096229, entitled "KEY POINT POSITIONING METHOD, TERMINAL, AND COMPUTER STORAGE MEDIUM", filed with the Chinese Patent Office on Aug. 7, 2017, which based upon and claims priority to Chinese Patent Application No. 201610654125.5, filed on Aug. 10, 2016, all of which are incorporated by reference in their entirety.

FIELD OF THE TECHNOLOGY

The present disclosure relates to an image recognition and positioning technology in the field of computer vision, and in particular, to a key point positioning method, a terminal, and a computer storage medium.

BACKGROUND OF THE DISCLOSURE

A user may perform various types of computer-aided recognition when capturing a target object using a camera. Use facial recognition as an example. Computer facial recognition endows a capability of recognizing people with unknown identities based on a face to a computer system, so that the computer system recognizes or verifies one or more faces from a static or dynamic scenario by using computer analysis and a mode recognition technology based on a known set of face samples. The technology has been widely applied to cases such as public safety, identity recognition, and the like. A facial recognition system includes steps such as facial detection, face key point positioning, recognition, and tracking, in which face key point detection and tracking are very important in the facial recognition, being a basis of applications such as facial authentication, facial recognition, and various types of three dimensional (3D) facial modeling, facial beautifying, tiredness and distress detection. Therefore, the accuracy of face key point detection and tracking is vital.

In the existing technology, a face key point positioning method using multiple facial parameter models is provided. Specifically, the face is classified based on a posture of the face or other features. Face samples for a respective type of faces are studied to obtain an independent facial parameter model by modeling, that is, multiple facial parameter models need to be designed for multiple classifications. Finally, a corresponding facial parameter model is selected to determine coordinates of the face key points by determining a facial classification.

SUMMARY

In conventional methods for face key point positioning, the key points positions can be output at the end of the calculation, but accuracy of the key point positioning result cannot be output at the end of the calculation at the same time. For example, when non-facial regions are mistakenly detected as facial regions in the image or when the positioning result of the face key points is poor (e.g., identified key points are far away from actual key features of the face in the image), a terminal cannot automatically address and avoid these errors. In this case, the terminal needs to introduce an additional determining manner to determine the error, which requires other specific processing methods (e.g., additional classifiers, additional models, additional training data, etc.), more memory storage space, leading to a complex and ineffective process of positioning the face key point. This is particularly unsuitable for mobile devices which are sensitive to model size, processing power requirement, and memory requirement, and particularly unsuitable for self-portrait and image beautifying usage scenarios.

To resolve the foregoing technical problem, the embodiments of the present disclosure expect to provide a key point positioning method, a terminal, and a computer storage medium, which can determine the accuracy of tracking a face key point and improve a processing speed of tracking the face key point while occupying little memory. The present solution utilizes multitasking CNN network framework, allowing the network to output key point positioning results and corresponding confidence values of the key point positioning results, and has advantages such as high accuracy, fast speed (e.g., within 5 ms on current mobile devices), and small size (e.g., model size less than 1 MB).

In one aspect, a facial key point positioning method is performed at a device having one or more processors and memory. In a user interface of an image capturing application, the device displays a target detection region for facial recognition at a location in a field of view of a camera represented in the user interface. In accordance with a determination that a first target image is captured, the device provides a portion of the first target image within the target detection region to an input layer of a preset first model set to calculate positions of a first set of face key points and a first confidence value. The first set of face key points and the first confidence value are output by the preset first model set for a single input of the portion of the first target image into the preset first model set. In accordance with a determination that the first confidence value meets a first preset threshold, the first preset threshold corresponds to whether the target image is a face image: the device obtains a second target image corresponding to the positions of the first face key points in the target detection region; the device inputs the second target image into the preset first model set to calculate a second confidence value, the second confidence value corresponds to accuracy of the positions of the face key points; and in accordance with a determination that the second confidence value meets a second preset threshold, the device outputs the positions of the first face key points as final face key points of the target image in the user interface.

According to a second aspect of the present disclosure, a computing device includes one or more processors, memory, a display, a touch-sensitive surface, and a plurality of instructions stored in the memory that, when executed by the one or more processors, cause the computing device to perform the aforementioned method.

According to a third aspect of the present disclosure, a non-transitory computer readable storage medium storing a plurality of instructions configured for execution by a computing device having one or more processors, the plurality of instructions causing the computing device to perform the aforementioned method.

Details of one or more embodiments of the present disclosure are provided in the following accompanying drawings and descriptions. Other features, objectives, and advantages of the present disclosure become clear in the specification, the accompanying drawings, and the claims.

The embodiments of the present disclosure provide a key point positioning method and a terminal. A target detection region for facial recognition and positioning is generated on a target image according to a preset configuration when acquiring the target image; a first target image corresponding to the target detection region is input into a preset first model set and a position of a first face key point and first confidence are calculated; a second target image corresponding to the position of the first face key point in the target detection region is obtained when the first confidence is greater than or equal to a preset threshold; the second target image is input into the preset first model set and second confidence is calculated; and the accuracy of the position of the first face key point is determined according to the second confidence; and the position of the first face key point is determined to be a position of a final face key point of the target image when the second confidence is greater than or equal to preset accuracy. The foregoing technology is used to implement the solutions. The terminal can synchronously determine positioning accuracy of the face key point when using the preset first model set to position the face key point and determine the accuracy of tracking the face key point when a time of subsequent re-determining of the accuracy and occupied space are reduced, thus improving a processing speed of tracking the face key point.

DESCRIPTION OF EMBODIMENTS

The technical solutions of embodiments of the present disclosure are clearly and completely described in the following with reference to the accompanying drawings in the embodiments of the present disclosure.

A terminal refers to a mobile electronic device, and is further referred to as a mobile device, a flow device, a handheld device, a wearable device, and the like, which is a calculation device based on an embedded chip. There is usually a small display screen input by touching or a small keyboard.

Machine learning depends on theories such as probability, statistics, nerve spreading, and the like, so that a computer can simulate a human learning action to obtain new knowledge or skills and reorganize an obtained knowledge structure, so as to keep improving performance of the computer.

Model training includes inputting samples that are manually selected to a machine learning system. Model parameters are continually adjusted to finally optimize the accuracy of sample reorganization by the model.

Figure 1:
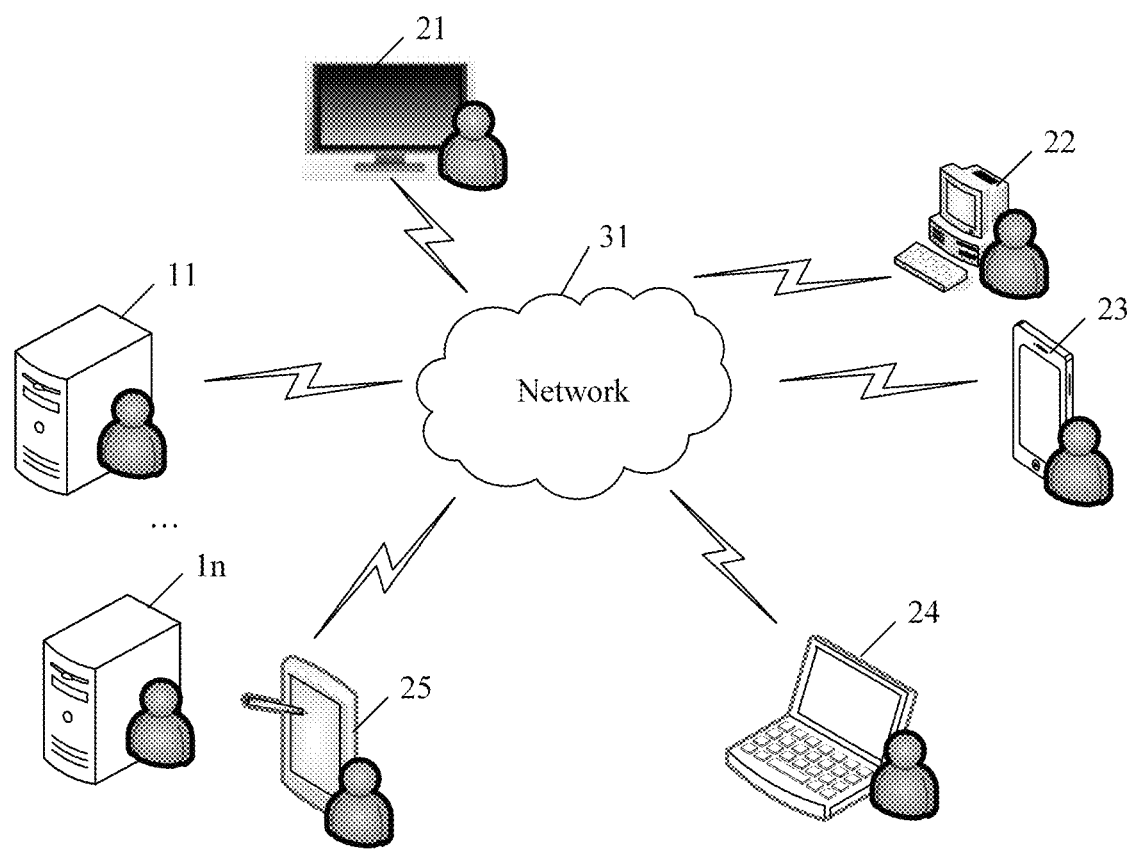
FIG. 1 is a schematic diagram of each hardware entity that performs an information exchange according to an embodiment of the present disclosure.

FIG. 1 is a schematic diagram of respective hardware entities in a system architecture that performs an information exchange according to an embodiment of the present disclosure. In FIG. 1, one or more servers 11-1n, terminal devices 21-25, and a network 31 are included. The network 31 includes network entities such as a router, a gateway, and the like, which is not shown in FIG. 1. The terminal devices 21-25 perform an information exchange of a service product by using a wired network or a wireless network with the servers 11-1n, so as to obtain related data generated by a user action from the terminals 21-25 and transmit the data to the servers 11-1n. Types of the terminal devices are shown in FIG. 1, including types of a smartphone (the terminal 23), a tablet computer or a PDA (the terminal 25), a desktop computer (the terminal 22), a PC (the terminal 24), an appliance (the terminal 21), and the like. The terminal device is installed with various application functional modules needed by users, such as an application with an entertainment function (for example, a video application, an audio playing application, a game application, and reading software), or an application with a service function (for example, a map navigation application, a group shopping application, an image-capturing application, and the like), or a system function that sets an application.

Based on the system shown in FIG. 1, use that an application needed by the user is an image-capturing application as an example. When performing face recognition, the terminal devices 21-25 download a camera application and/or an updating data packet for an image-capturing application and/or data information or service information related to an acquisition functional application by using the network 31 from the servers 11-1n based on needs. This embodiment of the present disclosure is used to start the image-capturing application on the terminal device to perform acquisition of a target object (e.g., capturing an image of a person's face). This includes: generating a target detection region (e.g., a rectangular box in the user interface) for facial recognition and positioning on a target image, according to a preset configuration, when acquiring the target image; inputting a first target image corresponding to the target detection region into a preset first model set (e.g., in the shared branch) and calculating positions of first face key points and a first confidence value; obtaining a second target image corresponding to the positions of the first face key points in the target detection region when the first confidence is greater than or equal to a preset threshold (e.g., target image is a face image); inputting the second target image into the preset first model set (e.g., in the confidence branch) and calculating second confidence; and determining the accuracy of the positions of the first face key points according to the second confidence; and determining that the positions of the first face key points are positions of final face key points of the target image when the second confidence is greater than or equal to preset accuracy. The foregoing technology is used to implement the solutions. The terminal can synchronously determine positioning accuracy of the face key points when using the preset first model set to position the face key points, and determine the accuracy of tracking the face key points where a time of subsequent re-determining of the accuracy and occupied space are reduced, thus improving a processing speed and efficiency of tracking the face key points in an image.

The example in FIG. 1 merely implements a system architecture example in this embodiment of the present disclosure. This embodiment of the present disclosure is not limited to the system architecture in FIG. 1. The embodiments of the present disclosure are provided base on the system architecture.

Figure 2:
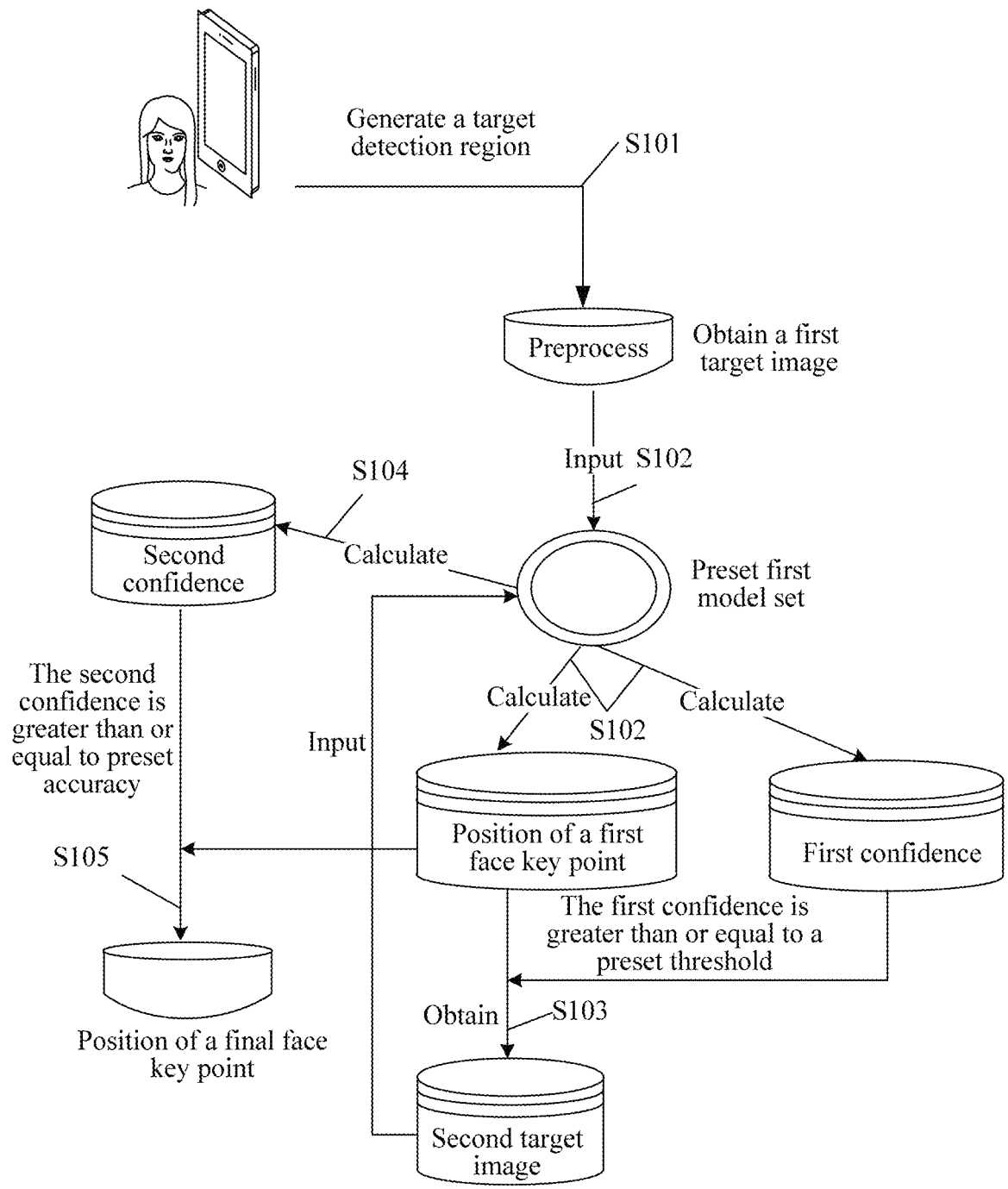
FIG. 2 is a schematic framework diagram of a key point positioning method according to an embodiment of the present disclosure.

An embodiment of the present disclosure provides a key point positioning method. As shown in FIG. 2, the method may include:

S101: Generate a target detection region for facial recognition and positioning on a target image according to a preset configuration when acquiring the target image.

In this embodiment of the present disclosure, the key point positioning method refers to a face key point positioning method. Face key point positioning refers to accurately finding positions of the face key points by using an algorithm. A face key point is a key point on a face with powerful presentation capabilities, for example, points on eyes, a nose, a mouth, a facial profile, and the like.

Figure 3:
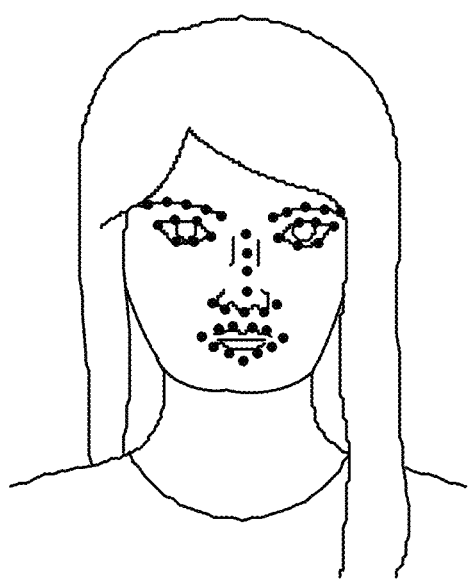
FIG. 3 is a schematic diagram of a face key point according to an embodiment of the present disclosure.

In some embodiments, FIG. 3 is a schematic diagram of a distribution of some initial key point positions of a face image. There are 49 key points in the key point distribution of this embodiment of the present disclosure.

It should be noted that an application scenario of the key point positioning method provided in this embodiment of the present disclosure is a situation such as performing facial recognition and positioning, face image processing, facial tracking, or facial three-dimensional (3D) modeling, and the like.

In some embodiments, the target detection region in this embodiment of the present disclosure is a monitoring region set to detect the target object, for example, a facial detection frame. The facial detection frame may be rectangular, circle, or elliptic. This embodiment of the present disclosure can design the target detection region based on an actual application and does not limit a form or a shape of the target detection region.

In an implementation in this embodiment of the present disclosure, the preset configuration refers to the size of a target detection frame. The preset configuration can be adjusted based on the accuracy of face key point positioning, so as to reach the best size for face key point positioning. The preset configuration can be automatically adjusted according to certain regulations, or be manually changed by a user. Actual adjustment of the preset configuration is not limited in this embodiment of the present disclosure.

In some embodiments, the terminal in this embodiment of the present disclosure may be an electronic device supporting a facial recognition and positioning technology such as a smartphone, a laptop, a computer, or the like, which has an information acquisition function.

Specifically, the terminal supports the facial recognition and positioning technology. When performing face key point positioning, the terminal first needs to acquire a to-be-recognized target object (the target image), generates a target detection region for facial recognition and positioning on a target image according to a preset configuration and marks the target detection region, so that the marked target detection region is displayed on the face image to perform face key point positioning.

In an implementation in this embodiment of the present disclosure, a position of the target detection region of the target image may be initially considered as a central position of the target image. For example, when the length of the facial detection frame (the target detection region) is normalized to 1, a standard facial detection frame centering (0, 0) is marked. The position of the target detection region is determined based on the position of the face key point obtained by subsequently determining the preset first model set.

In some embodiments, when acquiring the target object in this embodiment of the present disclosure, the terminal may use a camera disposed on the terminal to acquire image information of the target object.

Specifically, for ease of using by the user, when there is a front-facing camera, the terminal can start the front-facing camera to acquire information of the current target object. When there is no front-facing camera, the terminal can start a back-facing camera to acquire image information of the current target object.

It should be noted that the information of the target object acquired in this embodiment of the present disclosure may be a face image, or an image of other scenes or animals. Therefore, after acquiring the target object, the terminal can finally detect a type of the image (e.g., whether the image is an image of a human face or other types of objects) by using a confidence branch of the preset first model set. When the target object acquired by the terminal is determined to be a face image, the preset first model set can output the positioning of the face key points, otherwise, the key point positioning results are discarded.

It may be understood that in this embodiment of the present disclosure, there is a low possibility that biological feature information of the user is a user with same or similar features. Therefore, a facial feature using the biological feature information of the user is not easy to be stolen. Therefore, secrecy of using a facial recognition manner to run various applications is very good.

Figure 4:
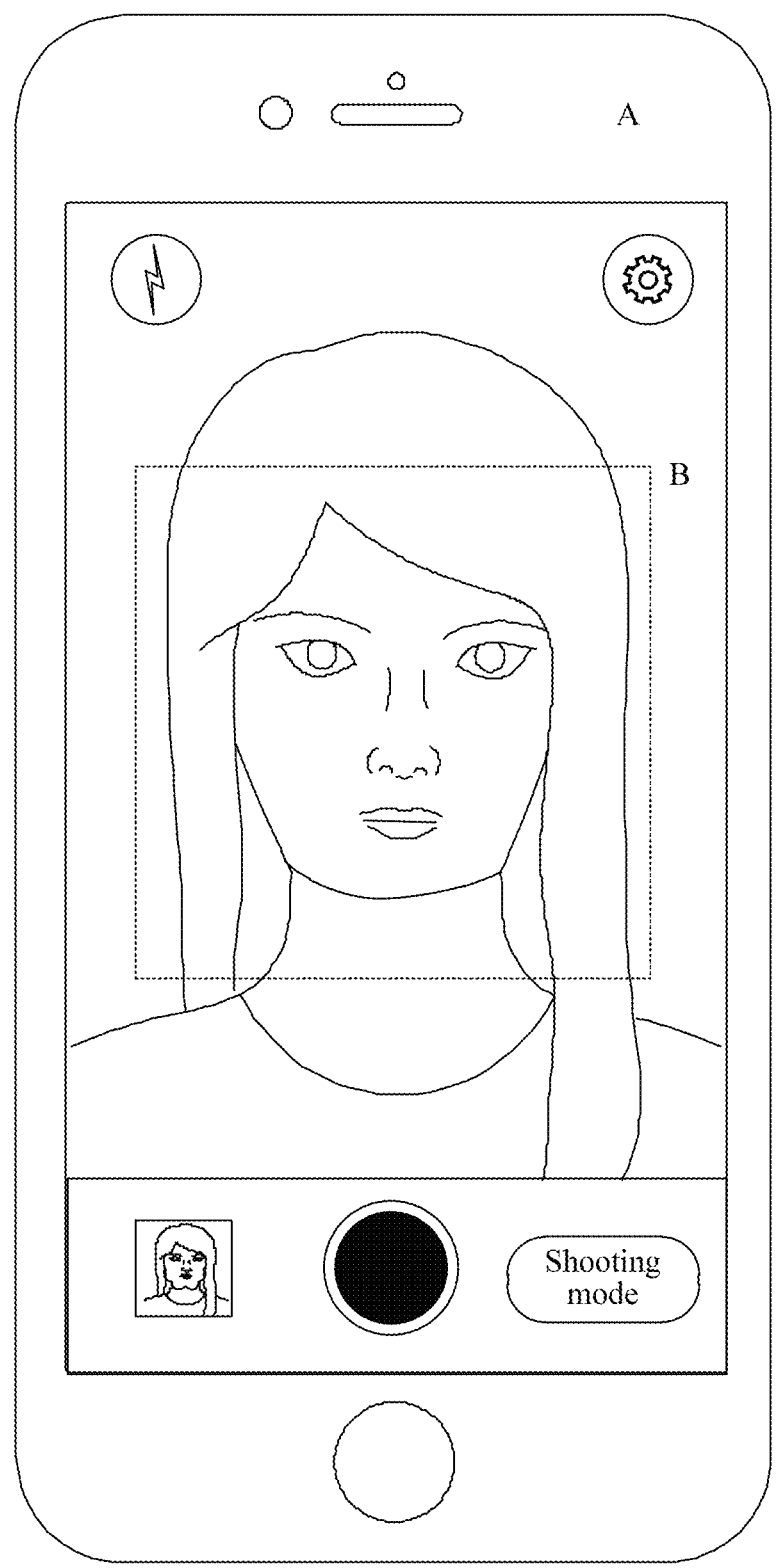
FIG. 4 is a schematic diagram of marking a target detection region according to an embodiment of the present disclosure.

For example, as shown in FIG. 4, it is assumed that a smartphone A uses a face to encrypt. When the smartphone A is used, after a button is started, a front-facing camera of the smartphone A acquires image information of the user. The smartphone A generates a target detection region B for facial recognition and positioning on a face image according to a preset configuration and marks the target detection region B as a rectangular frame.

S102: Input a first target image corresponding to the target detection region into a preset first model set and calculate a position of a first face key point and first confidence.

A terminal generates a target detection region for facial recognition and positioning on a target image according to a preset configuration. The target detection region marks a face image in a region, so that a face image in a facial detection region marked by the target detection region is referred to as the first target image. When this embodiment of the present disclosure performs facial recognition (face key point positioning), the terminal inputs the first target image into the preset first model set used for facial recognition. In this case, the preset first model set can output information such as the first face key point and its corresponding confidence.

It should be noted that the preset first model set in this embodiment of the present disclosure is used to present a set of relationship models between the face image and positions of first face key points and their corresponding confidence values. Therefore, after inputting the first target image into the preset first model set, the terminal outputs (calculates) an accuracy value presenting whether the first target image is a face by using the preset first model set, that is, the first confidence.

It may be understood that in this embodiment of the present disclosure, the target image may be a face image or a non-face image, or a face image with an abnormal size (e.g., too large or too small relative to the display). In this case, it can be determined by the preset first model set that whether a selection of the first target image in the target image by the terminal is a selection of the face image and whether a facial area of the selected face image is totally selected. The terminal inputs the first target image into the preset first model set to output the first confidence to determine the accuracy that the first target image selected by the target detection region is a face image with a proper size.

It should be noted that an initial position of the target detection region in this embodiment of the present disclosure may be a center of an image (or may be other setting manners, which is not limited in this embodiment of the present disclosure), so that when the target image acquired by the terminal is not a face image or a position of the acquired face image is offset too much, a value of the first confidence corresponding to the first target image obtained by the terminal is relatively low, or otherwise, when the face image selected by the first target image is complete and whole, the value of the first confidence corresponding to the first target image is relatively high.

In an implementation of this embodiment of the present disclosure, the position of the target detection region can be a center of a display screen of the terminal. The size of a normal face image of the target image in this embodiment of the present disclosure may be the size of the display screen of the terminal. In this case, when the target image acquired by the terminal is the non-face image or a position of the acquired target image on the display screen tilts to up, down, left, or right, the first target image corresponding to the target detection region obtains an unrelated face or an incomplete face, or the face cannot be obtained. As a result, the terminal can only obtain a small amount of data by using the preset first model set.

In some embodiments, the value of the first confidence in this embodiment of the present disclosure is between 0-1. 1 presents the highest accuracy and 0 presents the lowest accuracy.

Figure 5A:
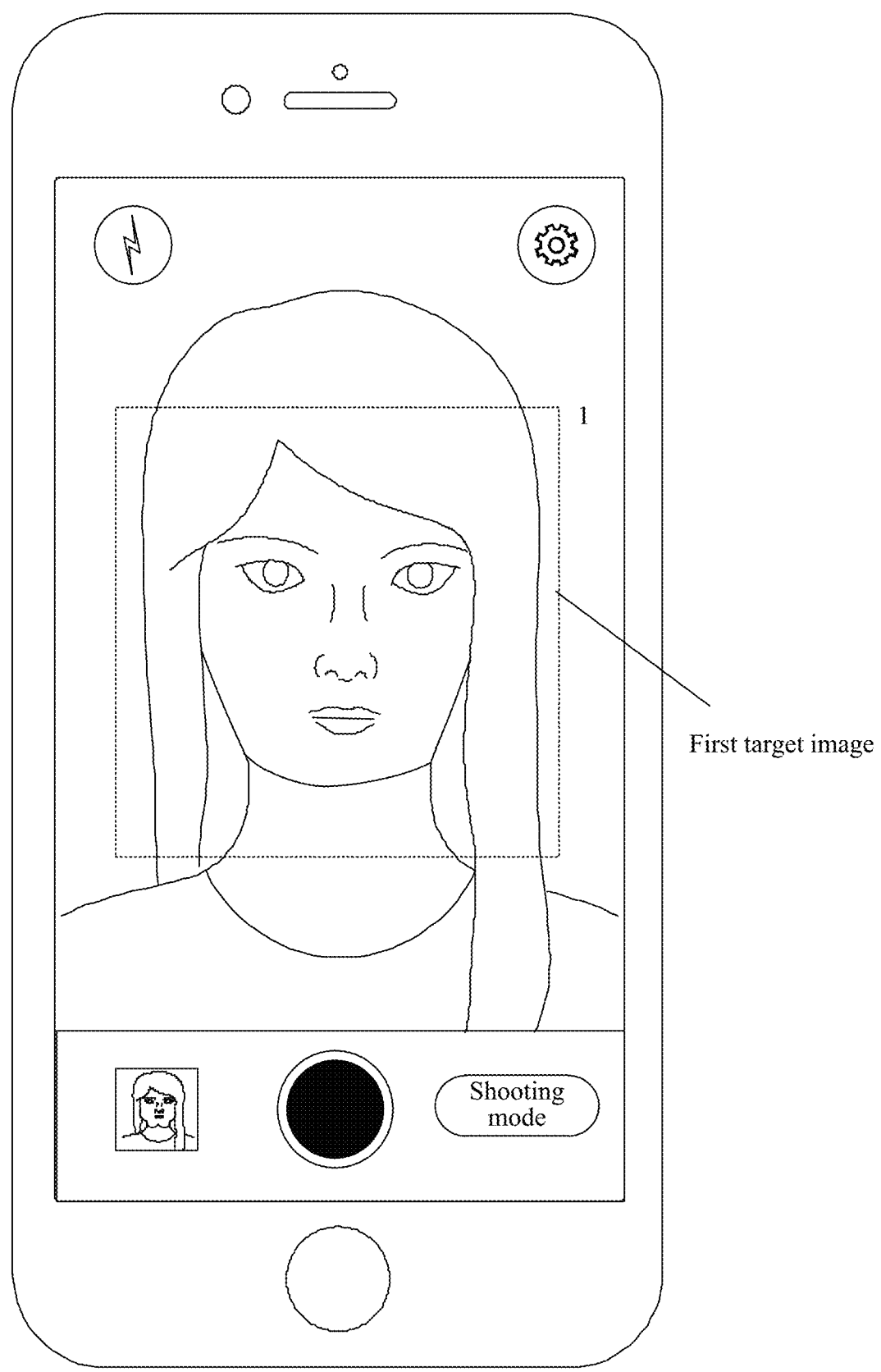
FIG. 5a is a schematic diagram of a first target image of a normal face image in a target detection region according to an embodiment of the present disclosure.
Figure 5B:
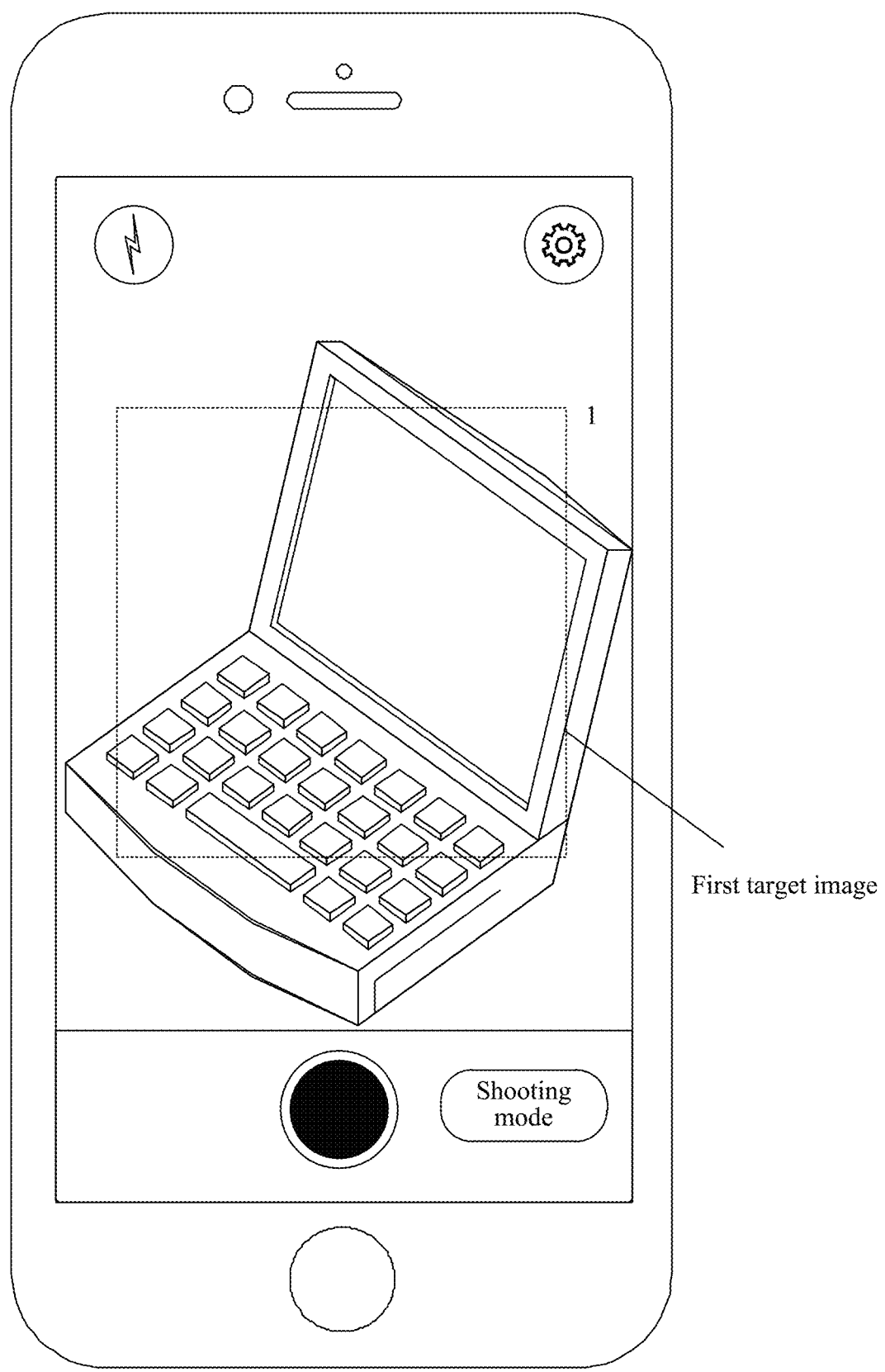
FIG. 5b is a schematic diagram of a first target image of a non-face image in a target detection region according to an embodiment of the present disclosure.
Figure 5C:
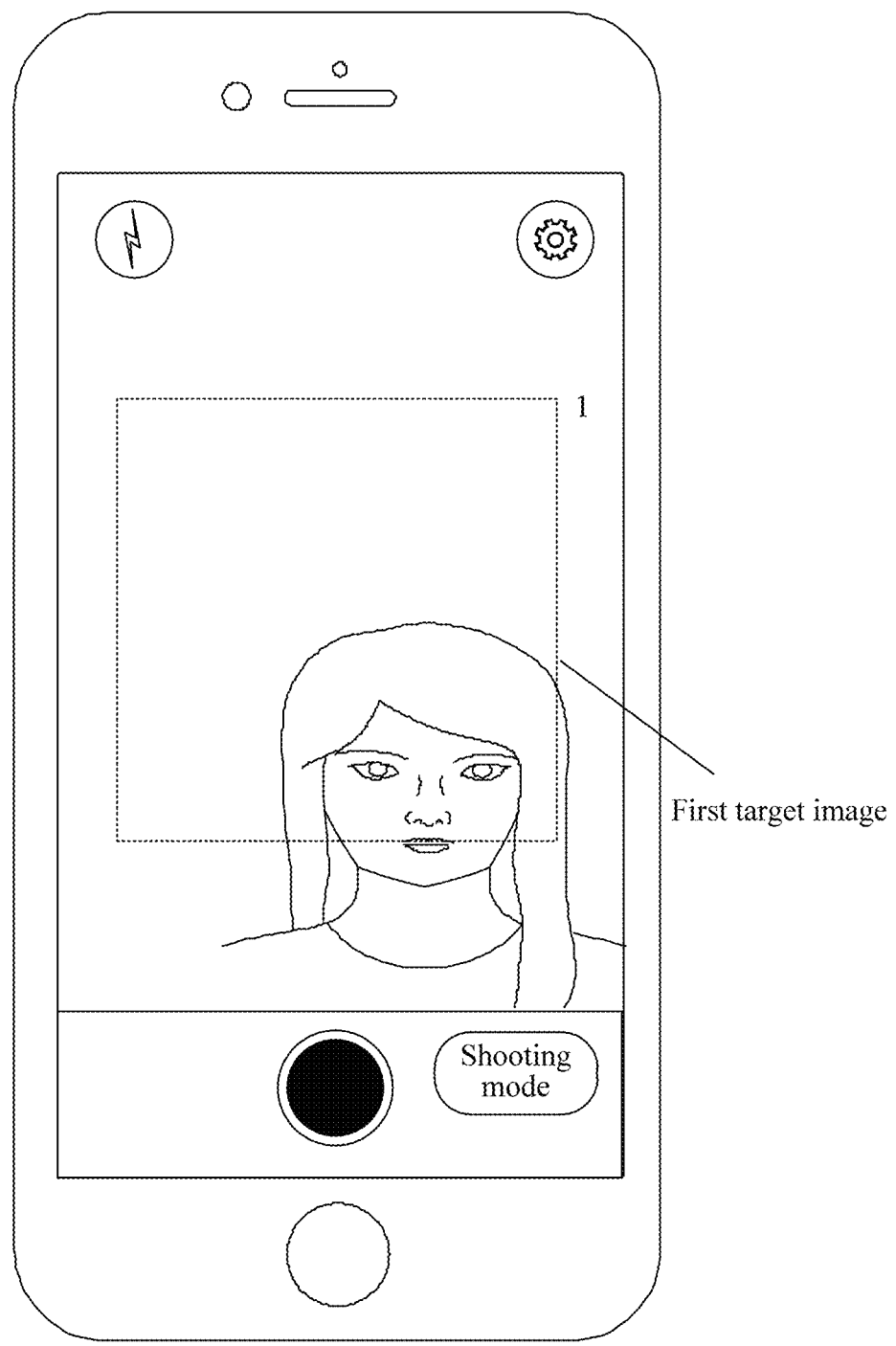
FIG. 5c is a schematic diagram of a first target image of an abnormal face image in a target detection region according to an embodiment of the present disclosure.
Figure 6:
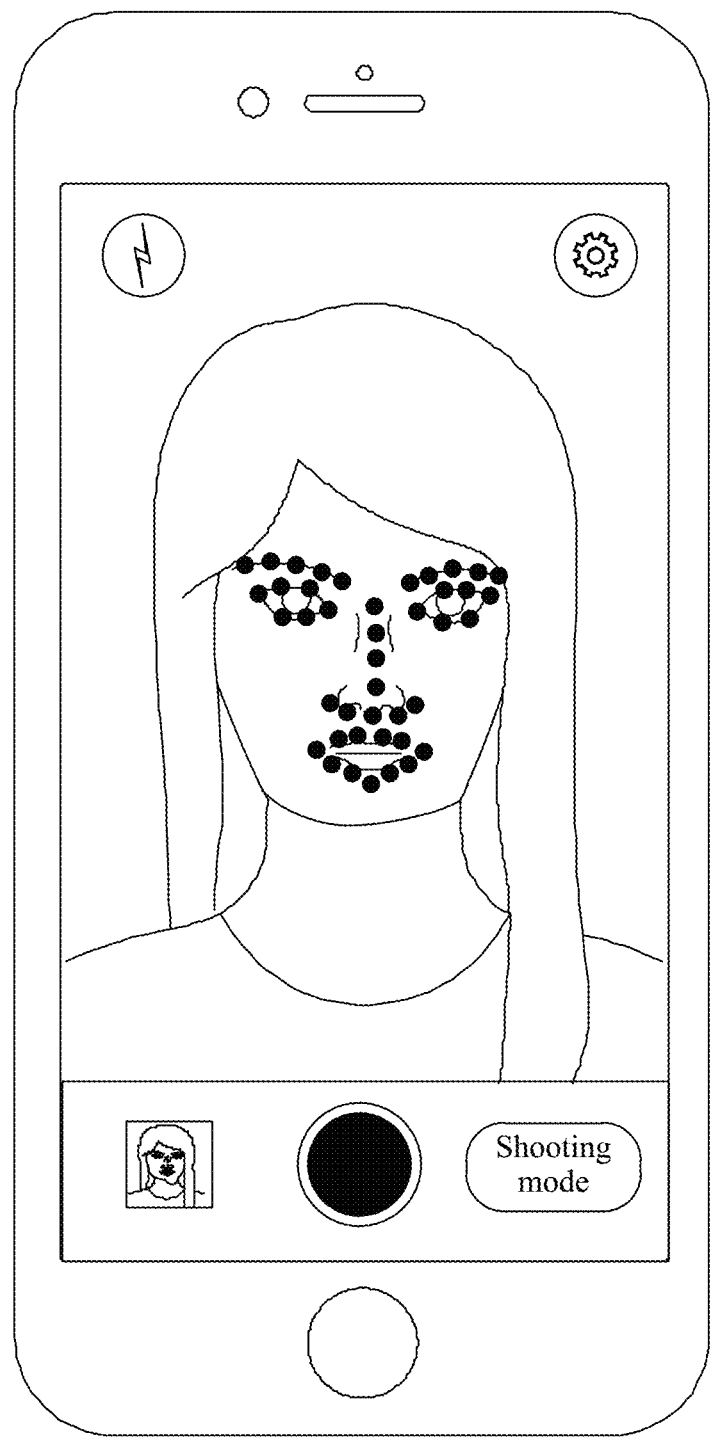
FIG. 6 is a position effect drawing of a first face key point of a normal face image according to an embodiment of the present disclosure.
Figure 7:
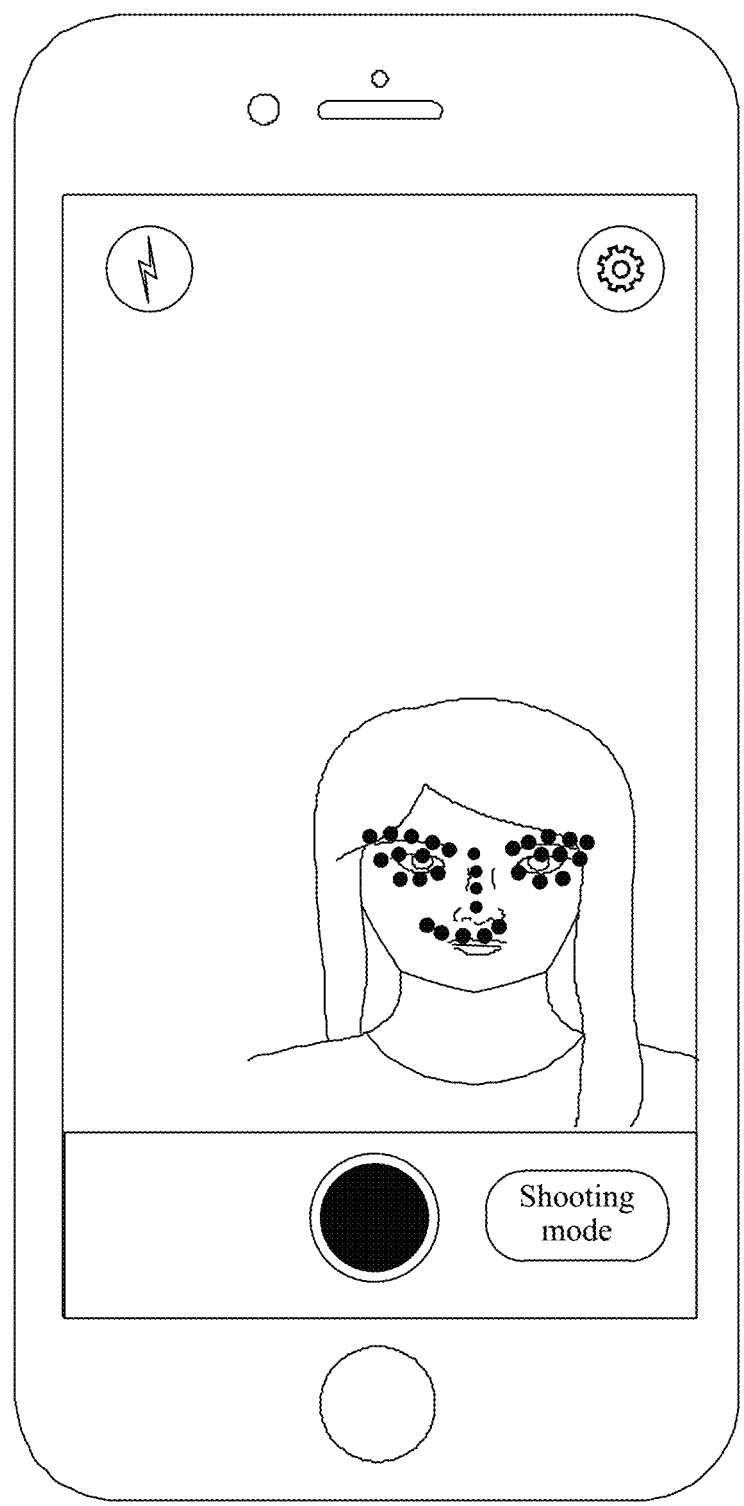
FIG. 7 is a position effect drawing of a first face key point of an abnormal face image according to an embodiment of the present disclosure.

For example, as shown in FIGS. 5a-5c, FIG. 5a is a normal face image (a target image) acquired by a terminal. FIG. 5b is a non-face image (a target image) acquired by the terminal. FIG. 5c is a small-size face image (a target image) acquired by the terminal. A target detection region of the terminal is a rectangular frame 1. A first target image is an image framed by the rectangular frame 1. As shown in FIG. 5, a first target image obtained by the terminal in FIG. 5a is a face image and a facial part is relatively complete, a first target image obtained in FIG. 5b has no facial part, and a first target image obtained in FIG. 5c has an incomplete facial part. Therefore, the terminal inputs the first target image to a preset first model set. An output result of first confidence may be: first confidence output by an image in FIG. 5a may be 0.99, first confidence output by an image in FIG. 5b may be 0, and first confidence output by an image in FIG. 5c may be 0.45. The terminal inputs the first target image to the preset first model set and outputs positions of first facial key points (a positioning result). The positions of the first facial key points in FIG. 5a are specifically an output of coordinates of facial features (e.g., eyes, a nose, a mouth, an eyebrow, and the like) positioned on the face, and an effect of the positioning result is represented on a facial part shown in FIG. 6. The first target image in FIG. 5b is the non-face image. Therefore, the terminal cannot position the coordinates of key points of the facial features, that is, the output by using the preset first model set may have no result or a result of a first feature has no result of the coordinates of the key points. An output result by using the preset first model set in FIG. 5c may be an output of coordinates of key point positioning of partial facial features, an effect of the positioning result represented on a facial part is shown in FIG. 7. It is clear that the positioning results have lower accuracy in FIG. 7 than FIG. 6.

It should be noted that the preset first model set in this embodiment of the present disclosure is generated by training data and a detailed training process is described in the following embodiment.

Specifically, the preset first model set in this embodiment of the present disclosure can be obtained by training a multi-task convolutional neural network (CNN) network framework. Multiple tasks refer to a face key point positioning task and a confidence value determination task.

It should be noted that the preset first model set includes: a shared branch, a key point positioning branch, and a confidence branch, where the key point positioning branch and the confidence branch are respectively cascaded from the shared branch; an input of the shared branch is an input branch of the first model set; the key point positioning branch and the confidence branch are two output branches of the first model set; and the shared branch is a preset image feature data model in a building process of the preset first model set.

Specifically, the terminal inputs the first target image into the model of the shared branch, to extract first image features; inputs the first image features into the model of the key point positioning branch, to calculate the positions of the first face key points; and inputs the first image features into the model of the confidence branch, to calculate the first confidence.

S103: Obtain a second target image corresponding to the positions of the first face key points in the target detection region when the first confidence is greater than or equal to a preset threshold.

After the terminal obtains the first confidence of the first target image, the first confidence can represent the first target image or a specific type of the target image, for example, a normal face image or a non-face image, so that when the terminal determines that the possibility that the first target image is a normal face image is small according to the first confidence, which means that the possibility to obtaining accurate positioning of the face key points based on the current target image is small, the terminal directly stops or ends the positioning of the face key points to save calculation costs and working load, thus improving working efficiency. When the value of the first confidence is high, the terminal determines that the positioning of the face key points can be used to accurately position a facial part (e.g., eyes, nose, etc.) in the target image. Therefore, the terminal proceeds to generate a shape of facial features according to the positions of the obtained first face key points, that is, the second target image.

It should be noted that in this embodiment of the present disclosure, it is determined by a comparison result between the preset threshold and the first confidence whether the second target image corresponding to the positions of the first face key points can be obtained according to the value of the first confidence. The terminal can obtain the second target image corresponding to the positions of the first face key points in the target detection region when the value of the first confidence is greater than the preset threshold.

In some embodiments, the preset threshold in this embodiment of the present disclosure may be 0.5. The preset threshold may be set to a proper value obtained by experiments or data training, or may be a proper value automatically set by a user. This embodiment of the present disclosure does not limit a value and a valuing manner of the preset threshold.

In an implementation of this embodiment of the present disclosure, after outputting the positions of the first face key points and the first confidence, the terminal determines, when the first confidence is smaller than the preset threshold, that the positioning of the positions of the first face key points fails and ends the positioning of the face key points.

Figure 8:
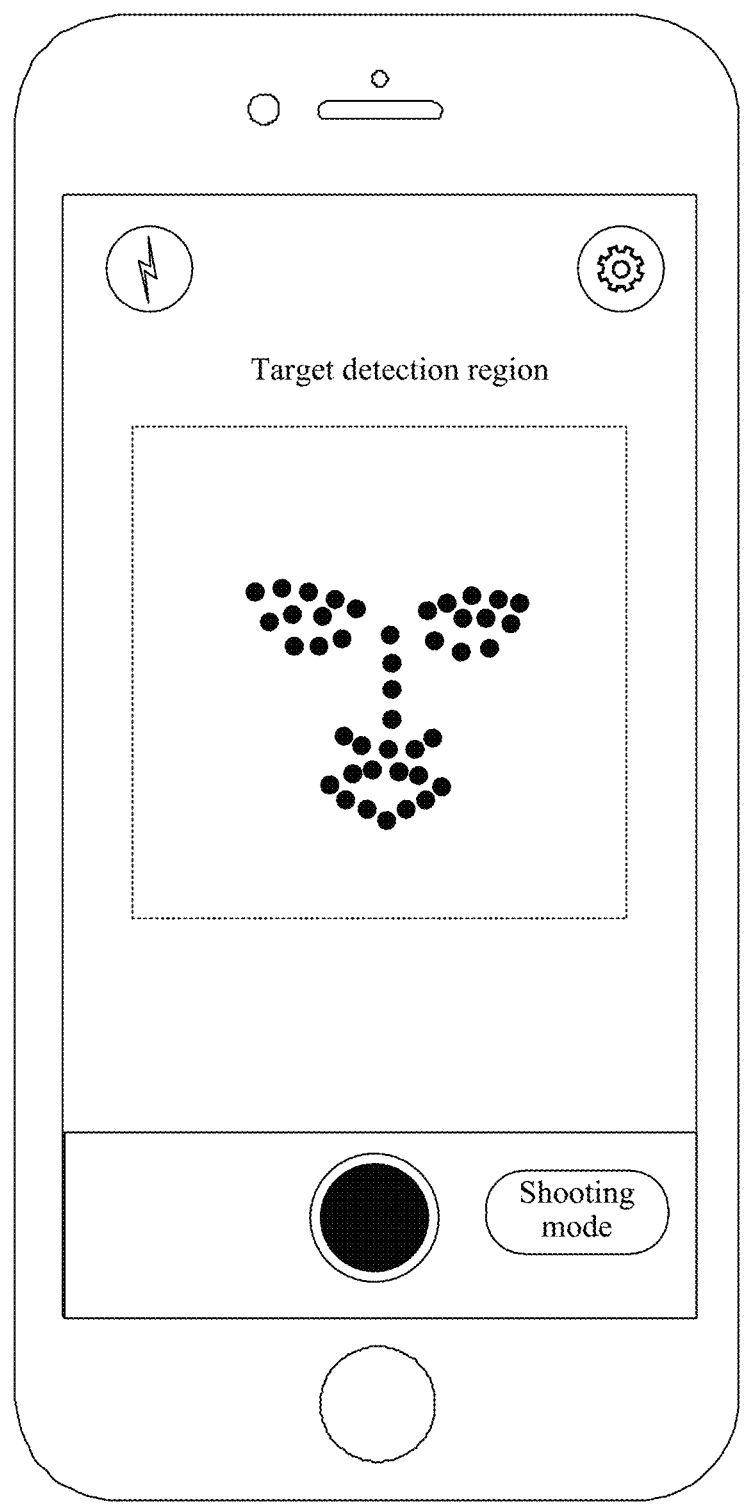
FIG. 8 is a schematic diagram of a second target image of a normal face image in a target detection region according to an embodiment of the present disclosure.

For example, it is assumed that the preset threshold is 0.5, and the terminal inputs the first target image into the preset first model set. An output result of the first confidence may be: first confidence output by an image in FIG. 5a may be 0.99, first confidence output by an image in FIG. 5b may be 0, and first confidence output by an image in FIG. 5c may be 0.45. Because 0.99 is larger than 0.5, as shown in FIG. 8, the terminal can obtain the second target image corresponding to the positions of the first face key points in the target detection region in FIG. 5a. Because 0 is smaller than 0.5, and 0.45 is smaller than 0.5, the terminal determines that the positioning of the positions of the first face key points in FIG. 5b and in FIG. 5c fails and ends the positioning of the face key points.

It may be understood that in a process of key point positioning, the terminal can initially select the target image according to the first confidence to pass out some non-face images or face images, so that the terminal can merely select the remaining target image to further perform the positioning of the face key point, thus reducing working load and occupied space of positioning of the face key points and improving the accuracy of the positioning of the face key points.

S104: Input the second target image into the preset first model set, calculate a second confidence, and determine the accuracy of the positions of the first face key points according to the second confidence.

When the terminal obtains the second target image, the terminal can determine the accuracy of the positions of the first face key points forming the second target image, so that the terminal can input the second target image into the preset first model set to output the second confidence and determine the accuracy of the positions of the first face key points according to the second confidence.

Specifically, the terminal inputs the second target image into the model of the shared branch, to extract second image features; and inputs the second image features into the model of the confidence branch, to calculate the second confidence.

It may be understood that a higher value of the second confidence represents a more accurate positioning of the positions of the first face key points.

In some embodiments, the value of the second confidence in this embodiment of the present disclosure is between 0 and 1. 1 presents the highest accuracy and 0 presents the lowest accuracy.

S105: Determine that the positions of the first face key points are positions of final face key points of the target image when the second confidence is greater than or equal to preset accuracy.

After the terminal outputs the second confidence, the second confidence can represent a second target image or the accuracy of positioning of the first face key points to the target image, so that when the terminal determines that the positions of the first face key points are relatively accurate according to data of the second confidence, the terminal determines that the positions of the first face key points are the positions of the final face key points of the target image.

It should be noted that in this embodiment of the present disclosure, a result of determining whether the positions of the first face key points are the positions of the final face key points according to a value of the second confidence can be determined by a comparison result between the preset accuracy and the second confidence. The terminal can determine that the positions of the first face key points are the positions of the final face key points of the target image when the value of the second confidence is greater than or equal to preset accuracy.

In some embodiments, the preset accuracy in this embodiment of the present disclosure may be 0.9. Setting of the preset accuracy may be a proper value automatically set by a user according to needed accuracy, or may be a value automatically adjusted by the terminal according to different application scenarios and needs. This embodiment of the present disclosure does not limit a value and a valuing manner of the preset accuracy.

In an implementation of this embodiment of the present disclosure, after outputting the second confidence, when the second confidence is less than the preset accuracy, the terminal determines that the positioning of the positions of the first face key points fails or there is a big error. Therefore, the terminal needs to readjust the target image or reacquire the target image, reperform key point positioning, and prompt the user with information of re-capturing, which may be displayed to the user by a display screen.

Specifically, the terminal can adjust the size of the target detection region (a side length of the target detection region) to reposition the face key point. The terminal may further reacquire the target image by displaying information of re-capturing to the user, so as to reposition the face key points to the reacquired image.

It may be understood that the terminal may readjust the target image or reacquire the target image and reperform key point positioning according to the second confidence. Therefore, the accuracy of the position of the face key point finally obtained by using a key point positioning method in this embodiment of the present disclosure may be very high.

It should be noted that the key point positioning method in this embodiment of the present disclosure is applied to various applications of a facial recognition technology. Therefore, when the terminal determines the position of the face key point of the target image, a corresponding application can be applied, for example, using image processing software to recognize a position of facial features, so as to make up the facial features of the target image, thereby generating a personal image to satisfy user needs.

In this embodiment of the present disclosure, the preset first model set includes calculation of the confidence, so that the terminal can determine positioning accuracy of the face key points when using the preset first model set to position the face key points and implement determining the accuracy of tracking the face key points when a time of subsequent re-determining of the accuracy and occupied space are reduced, thus improving a processing speed of tracking the face key points.

Figure 9:
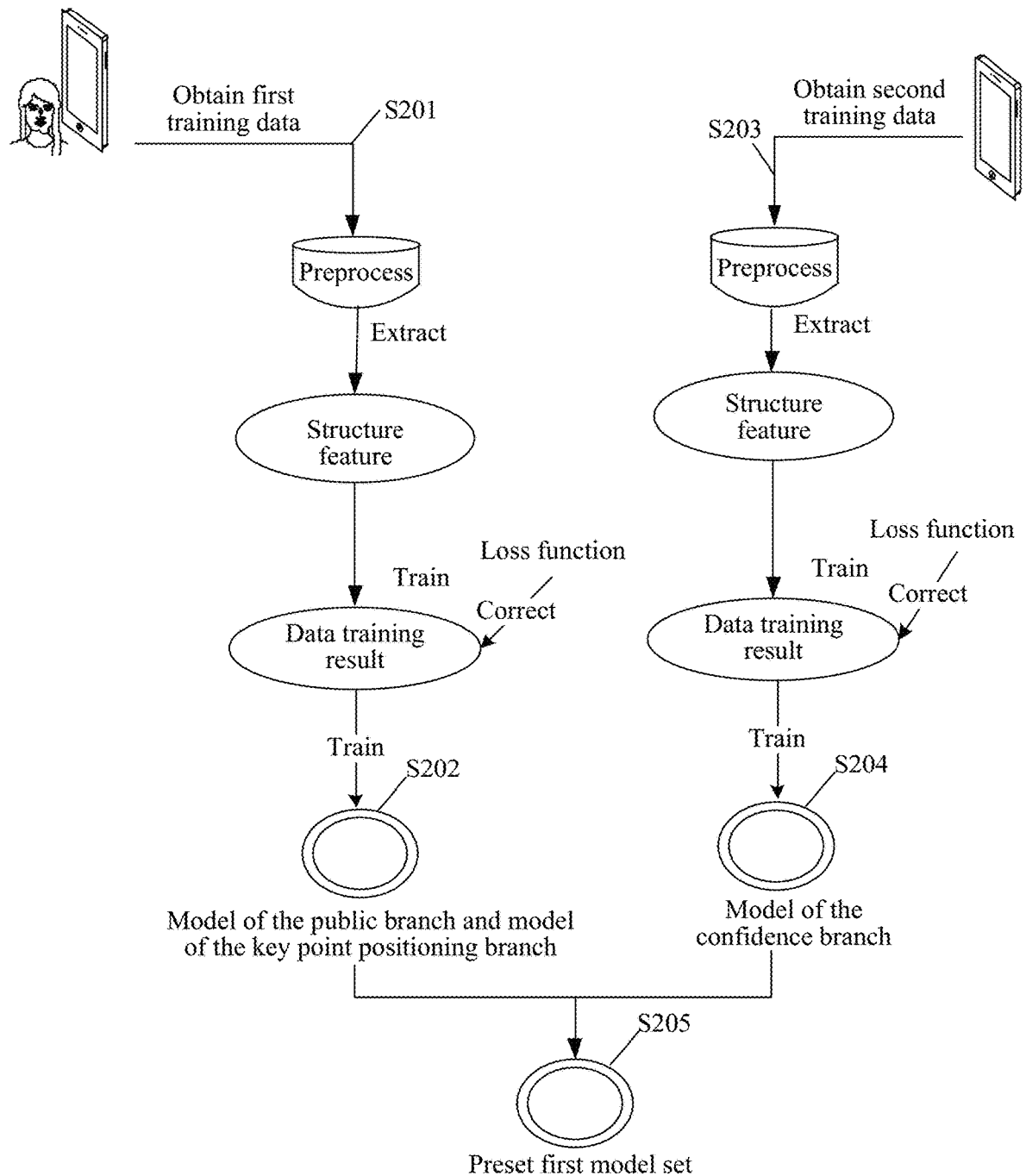
FIG. 9 is a first schematic diagram of a training process of a model according to an embodiment of the present disclosure.

This embodiment of the present disclosure provides a key point positioning method. Based on the key point positioning method described above, before performing actual positioning of a face key point, a terminal first needs to perform a setting process of a preset first model set, that is, a training process of the preset first model set. The preset first model set includes: a shared branch, a key point positioning branch, and a confidence branch, where the key point positioning branch and the confidence branch are respectively cascaded from the shared branch (e.g., the output of the shared branch provides input to both the positioning branch and the confidence branch); an input of the shared branch is an input branch of the first model set; the key point positioning branch and the confidence branch are two output branches of the first model set; and the shared branch is an image feature data model in a building process of the preset first model set. Therefore, based on the technical solution described above, the training process of the preset first model set by the terminal is shown in FIG. 9, including:

S201: Obtain first training data for face key point positioning, the first training data including pair-wise correspondences between face images and respective sets of pre-calibrated key point coordinates.

S202: Train model parameters of the shared branch and the key point positioning branch according to the first training data to obtain a model of the shared branch and a model of the key point positioning branch.

S203: Obtain second training data for confidence, the second training data being a classification set of target images.

S204: Train model parameters of the confidence branch according to the second training data, to obtain a model of the confidence branch.

S205: Cascade the trained key point positioning branch and the trained confidence branch respectively from the shared branch, to generate the preset first model set.

It should be noted that in this embodiment of the present disclosure, for models of the key point positioning branch and the confidence branch to be respectively connected to the shared branch, first, the models of the three branches are trained separately, then the connections of the models need to be established to find the model parameters of each connection relationship in a data training process.

In some embodiments, a CNN network is selected to establish the preset first model set. Therefore, the foregoing parameters can be weight values at each connection point of the models of the key point positioning branch and the confidence branch respectively to the shared branch.

Specifically, a model training on the key point positioning branch and the shared branch is performed by the terminal at the same time. The terminal obtains a correspondence between the face image and a preset set of marked key point coordinates, where the preset marked key point coordinates are coordinates by manually marking the key points of the face image. In this embodiment of the present disclosure, the terminal acquires multiple samples (multiple face images and corresponding sets of preset marked key point coordinates) to perform a model training on the key point positioning branch and the confidence branch. Further, the terminal acquires second training data for a classification set of the face images to train model parameters of the confidence branch and finally cascades the trained key point positioning branch and the trained confidence branch respectively from the shared branch, to generate the preset first model set. The classification set of the target images acquired by the terminal may include labels of the target images and corresponding face images. The label of the face image may be a label of facial recognition, for example, a facial label of a normal-size face image is 1 and a non-face image or an abnormal face image is 0, where setting of a specific facial label is not limited in this embodiment of the present disclosure.

It should be noted that when the terminal performs the model training on the shared branch and the key point positioning branch, the model parameters of the confidence branch established by the terminal remains unchanged. When the terminal performs model training on the confidence branch, the model parameters of the shared branch and the key point positioning branch remains unchanged.

It should be noted that a model training process in this embodiment of the present disclosure may be a simple mapping relationship of input and output that can be implemented through machine learning.

Based on the description in the foregoing embodiment, a model training on a model of the confidence branch in this embodiment of the present disclosure is used as an example for a model of the confidence branch based on introducing a machine learning technology. In an early period of forming the model of the confidence branch, it is needed to manually select multi-dimensional features as many as possible for a machine learning model to train. Some features are selected to describe according to discriminability of a training result by the features. In this case, there is no human interference when selecting parameters and the machine learning can self-learn a proper parameter. A meaning of the features is more direct that the meaningless parameters, which may be easily understood after explanation with reference to distribution of the features. First, the face image and face key point positioning based on the machine learning model relate to comprehensive consideration related to the confidence, improving the accuracy of the face key point positioning. The model has a progress learning function. Even if an input value is updated or decreased, new input can be determined and the model of the confidence branch can be adjusted by simply re-performing the model training (sometimes minute adjustment needs to be performed on the features), so as to keep the accuracy of the confidence result.

Figure 10:
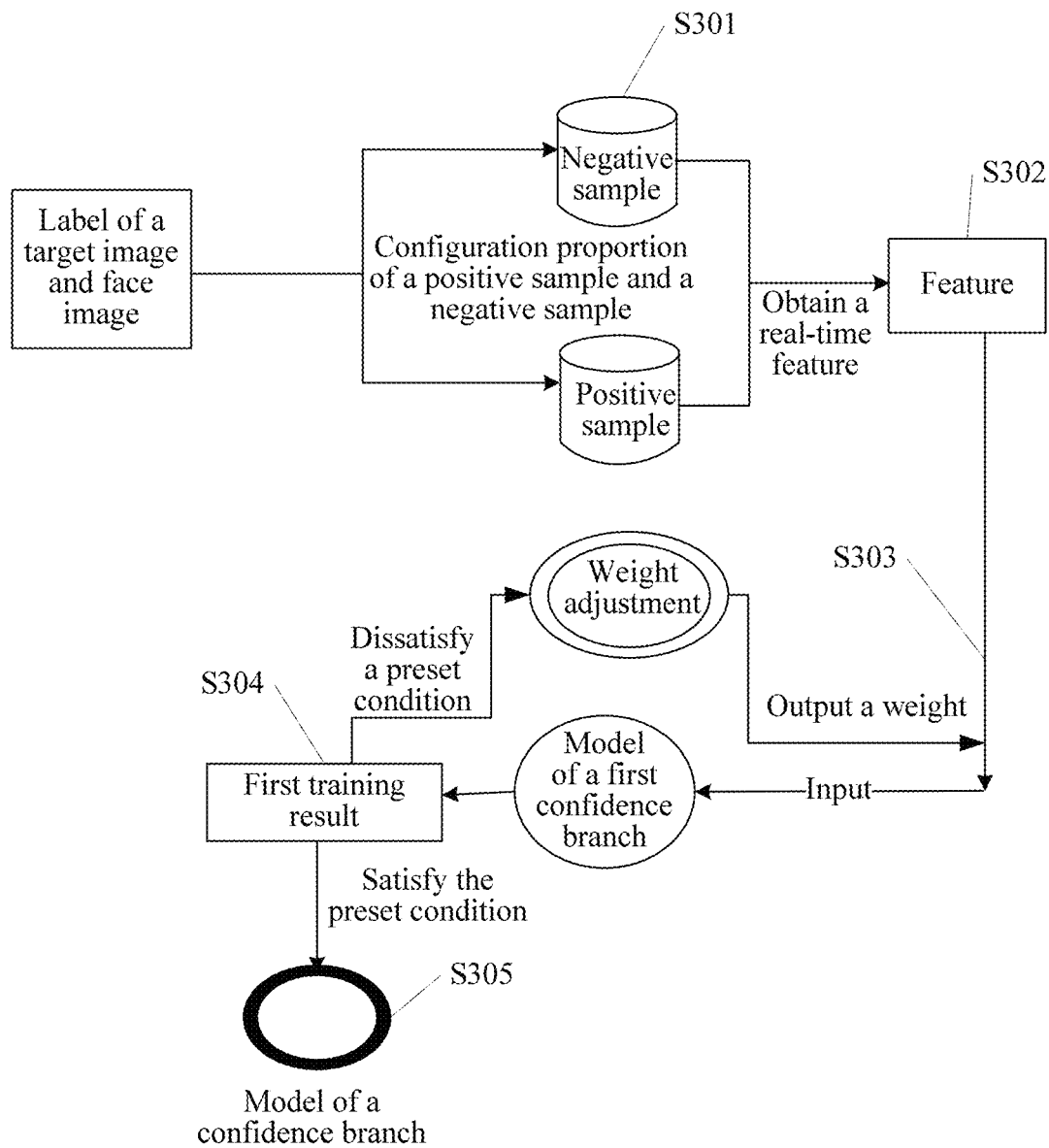
FIG. 10 is a second schematic diagram of a training process of a model according to an embodiment of the present disclosure.

Application of the machine learning technology in the confidence can be freely shared and spread because the machine learning has comprehensive confidence and is self-performing, but does not aim at a certain image, so that a confidence method based on the machine learning model can be disclosed to different images in a same terminal. Based on the foregoing embodiment, this embodiment of the present disclosure provides a method for training a model of a confidence branch. As shown in FIG. 10, the method includes:

S301: Obtain positive samples and negative samples according to a preset configuration ratio. The positive samples and the negative samples are labels of whether or not acquired target images correspond to face images.

Herein, in an actual operating process, there is a certain proportion that the labels of the target images correspond to a face image and to a non-face image. The proportion is the configuration ratio. When forming a model of the confidence branch, the terminal configures training data (the labels of the acquired target image as face image or non-face image) according to the configuration ratio.

S302: Extract features of the positive samples and the negative samples.

It should be noted that in this embodiment of the present disclosure, feature extraction by a server on the positive samples and the negative samples is the same as a construction principle of first features of a first entity.

It may be understood that, a more complete allowed range in which the positive samples and the negative samples are involved in this embodiment of the present disclosure is indicates more accurate subsequent confidence.

S303: Input the features of the positive samples or the negative samples into a preset model of a first confidence branch to obtain a first training result.

S304: Continuously repeat the training steps S303 and detect the preset model of the first confidence branch until the first training result satisfies a preset condition.

S305: Determine the preset model of the first confidence branch satisfying the preset condition as a final model of the confidence branch.

In this embodiment of the present disclosure, regardless of a type of a training model, before starting training, an input of the training model includes the foregoing different dimensional features. After many experiments, if the feature has no beneficial effect to the training result or distinguishes an error, a weight of the feature should be decreased. If the feature has a beneficial effect to the training result, the weight of the feature should be increased. If a weight of a parameter is reduced to 0, the feature has no use in the training model. After a final experiment of this embodiment of the present disclosure, it is a long-period feature (that is, a first feature and a facial feature) that effectively affects the training result in the foregoing different dimensional features. It is assumed in the following that different dimensional features include only first features (that is, other dissatisfied features have been excluded), then a forming process of the model of the confidence branch roughly includes: inputting the first features of the positive samples or the negative samples into the model of the first confidence branch; obtaining the first training result from the model of the first confidence branch, where the model of the first confidence branch is constructed with the first features and each first feature has a corresponding weight (e.g., a preset priority); continuously training and detecting till the first training result satisfies a preset condition; and using a first model as the final model of the confidence branch.

In some embodiments, the preset condition in this embodiment of the present disclosure can be that the accuracy of the confidence reaches a preset threshold. The preset threshold may be 90% and a specific preset threshold can be set, which is not limited in this embodiment of the present disclosure. However, a higher preset threshold indicates a more accurate model of the confidence branch reaching the preset threshold or the preset condition.

In view of the foregoing procedure, 1) This embodiment of the present disclosure introduces various different types of target images with labels regarding whether the target image is a face image to train the training model and determines the final determined confidence according to the training result, thus improving the accuracy of the confidence. 2) An obvious feature of the model of the confidence branch used in this embodiment of the present disclosure is that the model can self-improve, that is, the model automatically adjusts the weight of the feature according to a change in the confidence evaluation behavior, so as to avoid frequent manual interference of adjusting the parameter based on regulations.

Specifically, before outputting the model of the key point positioning branch and the model of the confidence branch by using the preset first model set, the terminal may further perform error correction on the model of the key point positioning branch and the model of the confidence branch respectively according to a preset policy; and determine a corrected model of the key point positioning branch and a corrected model of the confidence branch, for face key point positioning and confidence determining.

For example, a Euclidean loss function may be used to implement performing correction on the model of the key point positioning branch. A Softmax Loss function may be used to implement performing correction to the model of the confidence branch.

Figure 11:
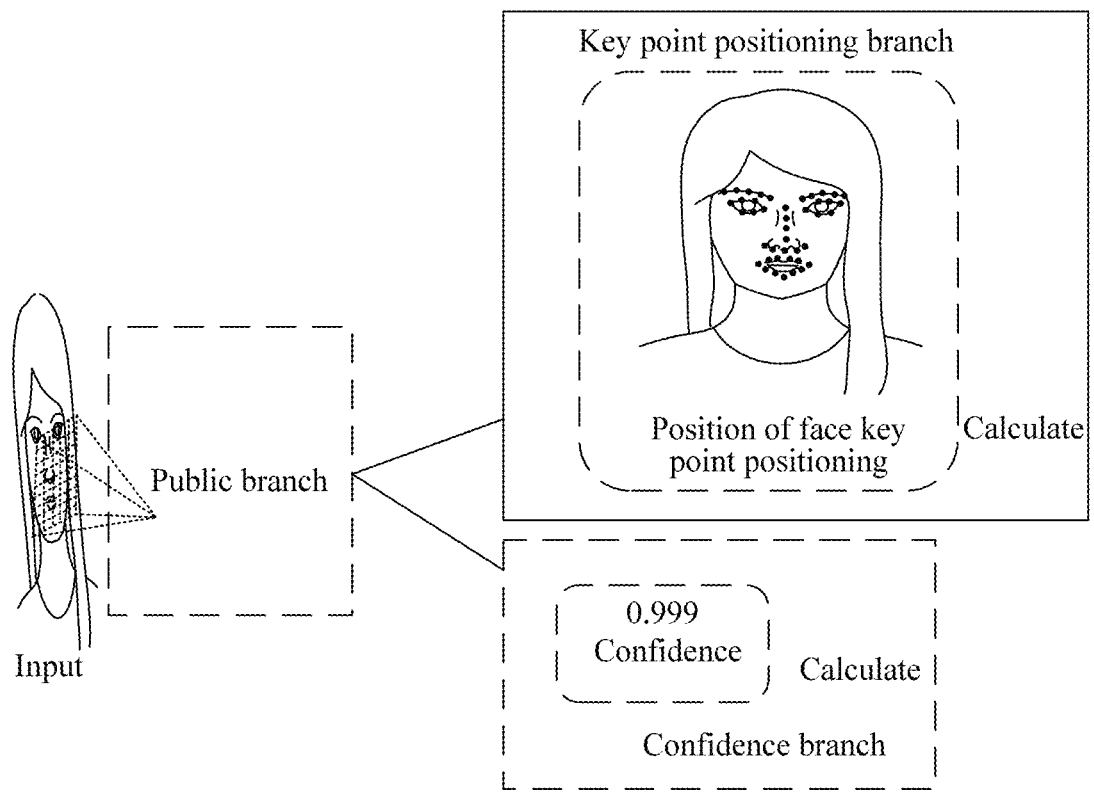
FIG. 11 is a schematic structural diagram of a preset first model set according to an embodiment of the present disclosure.

For example, FIG. 11 is a construction structure of a preset first model set. When using the preset first model set to perform the key point positioning method in various embodiments, as shown in FIG. 11, after inputting an image corresponding to the target detection region in the acquired target image 1 into the preset first model set, the terminal finally outputs positions of the face key points of the target image 1. A positioning effect is a positioning result of image key points at a right side in FIG. 11 and the accuracy (second confidence) at this time of the face key point positioning is 0.999.

It may be understood that in this embodiment of the present disclosure, compared with independent processing on the accuracy in the existing technology, the terminal can synchronously determine positioning accuracy of the face key points when using the preset first model set to position the face key points and determine the accuracy of tracking the face key points when a time of subsequent re-determining of the accuracy and occupied space are reduced, thus improving a processing speed of tracking the face key points.

Based on the above, in some embodiments, a facial key point positioning method is performed at a device having one or more processors and memory.

In a user interface of an image capturing application (e.g., a camera application with image processing capabilities (e.g., authentication, beautifying, etc.)), the device displays a target detection region (e.g., a square or rectangular box that is smaller than the field of view represented in the user interface indicating the suggested positioning of the target's face) for facial recognition at a location in a field of view of a camera (e.g., the field of view changes when movement of the camera until a target image is captured) represented in the user interface. In accordance with a determination that a first target image is captured (e.g., the shutter of the camera is pressed, and the image in the field of view of the camera is captured as a target image), the device provides a portion of the first target image within the target detection region to an input layer of a preset first model set to calculate positions of a first set of face key points and a first confidence value, wherein the first set of face key points and the first confidence value are output by the preset first model set for a single input of the portion of the first target image into the preset first model set (e.g., the portion of the first target image is not provided to the input layer of the preset first model set more than once to obtain the two separate results of the key point positioning and the confidence value determination). In accordance with a determination that the first confidence value meets a first preset threshold, the first preset threshold corresponds to whether the target image is a face image: the device obtains a second target image corresponding to the positions of the first face key points in the target detection region; the device inputs the second target image into the preset first model set to calculate a second confidence value, the second confidence value corresponds to accuracy of the positions of the face key points; and in accordance with a determination that the second confidence value meets a second preset threshold, the device outputs the positions of the first face key points as final face key points of the target image in the user interface.

In some embodiments, the preset first model set comprises a shared branch, a key point positioning branch, and a confidence branch, wherein the key point positioning branch and the confidence branch are respectively cascaded from the shared branch, an input of the shared branch is an input branch of the preset first model set; the key point positioning branch and the confidence branch are two output branches of the preset first model set, and the shared branch is an image feature data model in a building process of the preset first model set.

In some embodiments, the building process of the preset first model set includes: obtaining first training data for face key point positioning, the first training data comprising pair-wise correspondences between face images and respective sets of pre-calibrated key point coordinates; training model parameters of the shared branch and the key point positioning branch according to the first training data to obtain a model of the shared branch and a model of the key point positioning branch at the same time; obtaining second training data for confidence, the second training data being a classification set of previously acquired target images; training model parameters of the confidence branch according to the second training data to obtain a model of the confidence branch; and connecting the trained model of the key point positioning branch and the trained model of the confidence branch respectively to the model of the shared branch, to generate the preset first model set.

In some embodiments, providing a portion of the first target image within the target detection region to an input layer of a preset first model set to calculate positions of a first set of face key points and a first confidence value includes: inputting the portion of the first target image into the model of the shared branch, to extract first image features; inputting the first image features into the model of the key point positioning branch, to calculate the positions of the first face key points; and inputting the first image features into the model of the confidence branch, to calculate the first confidence value.

In some embodiments, inputting the second target image into the preset first model set to calculate a second confidence value includes: inputting the second target image into the model of the shared branch, to extract second image features; and inputting the second image features into the model of the confidence branch, to calculate the second confidence value.

In some embodiments, before training the model of the key point positioning branch and the model of the confidence branch, the device performs error correction on the model of the key point positioning branch and the model of the confidence branch respectively according to a preset policy; and the device determines a corrected model of the key point positioning branch and a corrected model of the confidence branch, for face key point positioning and confidence determining.

In some embodiments, after calculating the positions of the first face key points and the first confidence value, the device determines, in accordance with a determination that the first confidence value does not meet the first preset threshold, that the positioning of the positions of the first face key points fails; and ending the positioning of the face key points based on the first target image.

Other details of the method are described with respect to various embodiments disclosed herein, and are not repeated here in the interest of brevity.

Figure 12:
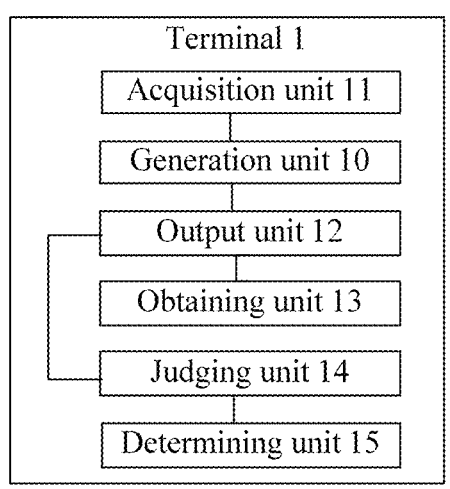
FIG. 12 is a first schematic structural diagram of a terminal according to an embodiment of the present disclosure.

As shown in FIG. 12, an embodiment of the present disclosure provides a terminal 1. The terminal 1 may include:

a generation unit 10, configured to generate a target detection region for facial recognition and positioning on a target image according to a preset configuration when an acquisition unit 11 acquires the target image;

an output unit 12, configured to input a first target image corresponding to the target detection region into a preset first model set and calculate a position of a first face key point and first confidence;

an obtaining unit 13, configured to obtain a second target image corresponding to the position of the first face key point in the target detection region when the first confidence is greater than or equal to a preset threshold;

the output unit 12, being further configured to input the second target image into the preset first model set and calculate second confidence;

a judging unit 14, configured to determine the accuracy of the position of the first face key point according to the second confidence; and a determining unit 15, configured to determine that the position of the first face key point is a position of a final face key point of the target image when the second confidence is greater than or equal to preset accuracy.

In some embodiments, the preset first model set includes: a shared branch, a key point positioning branch, and a confidence branch, where the key point positioning branch and the confidence branch are respectively cascaded to the shared branch; an input of the shared branch is an input branch of the first model set; the key point positioning branch and the confidence branch are two output branches of the first model set; and the shared branch is a data model of an image feature in a building process of the preset first model set.

Figure 13:
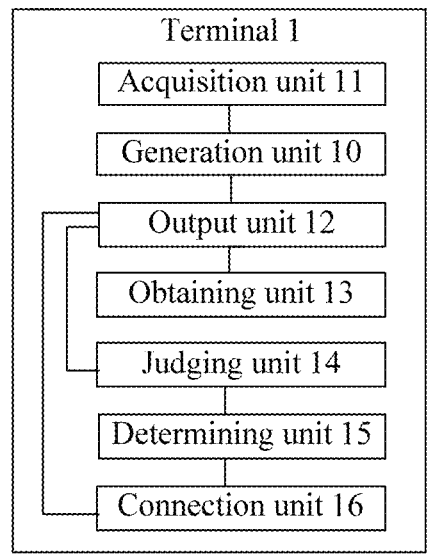
FIG. 13 is a second schematic structural diagram of a terminal according to an embodiment of the present disclosure.

In some embodiments, based on FIG. 12, as shown in FIG. 13, the terminal 1 further includes a connection unit 16.

The obtaining unit 13 is further configured to obtain first training data for face key point positioning, the first training data including a correspondence between a face image and a pre-calibrated key point coordinate.

The output unit 12 is further configured to train a model parameter of the shared branch and the key point positioning branch according to the first training data, to train a model of the shared branch and a model of the key point positioning branch.

The obtaining unit 13 is further configured to obtain second training data for confidence, the second training data being a classification set of the target image.

The output unit 12 is further configured to train a model parameter of the confidence branch according to the second training data, to train a model of the confidence branch.

The connection unit 16 is configured to cascade the trained model of the key point positioning branch and the trained model of the confidence branch respectively to the model of the shared branch, to generate the preset first model set.

In some embodiments, the output unit 12 is specifically configured to: input the first target image into the model of the shared branch, to extract a first image feature; input the first image feature into the model of the key point positioning branch, to calculate the position of the first face key point; and input the first image feature into the model of the confidence branch, to calculate the first confidence.

In some embodiments, the output unit 12 is specifically configured to: input the second target image into the model of the shared branch, to extract a second image feature; and input the second image feature into the model of the confidence branch, to calculate the second confidence.

Figure 14:
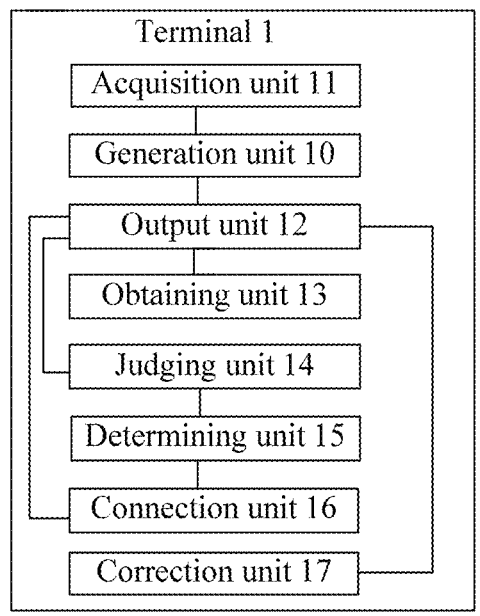
FIG. 14 is a third schematic structural diagram of a terminal according to an embodiment of the present disclosure.

In some embodiments, based on FIG. 13, as shown in FIG. 14, the terminal 1 further includes a correction unit 17.

The correction unit 17 is configured to: before the training a model of the key point positioning branch and a model of the confidence branch, perform error correction on the model of the key point positioning branch and the model of the confidence branch respectively according to a preset policy; and determine a corrected model of the key point positioning branch and a corrected model of the confidence branch, for face key point positioning and confidence determining.

In some embodiments, the determining unit 15 is further configured to: after the calculating a position of a first face key point and first confidence, determine, when the first confidence is smaller than the preset threshold, that the positioning of the position of the first face key point fails; and end the positioning of the face key point.

Figure 15:
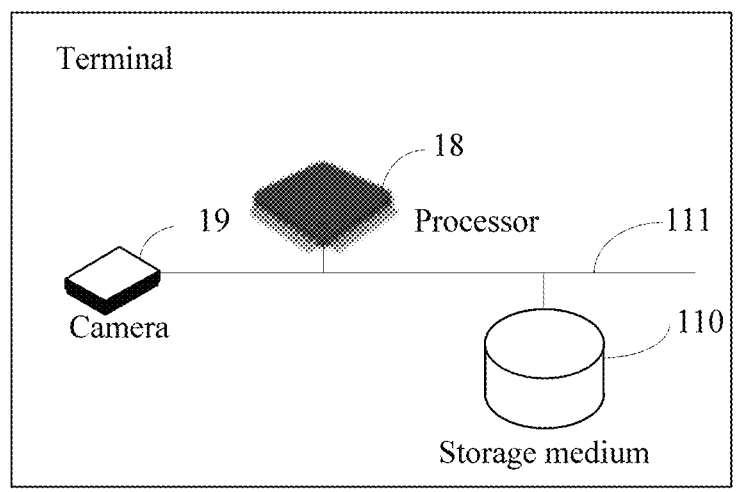
FIG. 15 is a fourth schematic structural diagram of a terminal according to an embodiment of the present disclosure.

As shown in FIG. 15, in an actual application, the generation unit 10, the obtaining unit 13, the determining unit 15, the judging unit 14, the connection unit 16, the correction unit 17, and the output unit 12 can be implemented by a processor 18 disposed on the terminal 1 with reference to other elements such as a camera 19 and a storage medium 110, specifically, implemented by a central processing unit (CPU), a micro processing unit (MPU), a digital signal processor (DSP), or a field programmable gate array (FPGA), and the like. The acquisition unit 11 is implemented by the camera 19. The terminal 1 may further include the storage medium 110. The storage medium 110 may be connected to the processor 18 by using a system bus 111. The storage medium 110 is configured to store executable program code. The program code includes computer operating instructions. The storage medium 110 may include a high-speed random access memory (RAM), or may further include a non-volatile memory, for example, at least one disk memory.

It should be noted that the terminal in FIG. 1 is the same as the terminal 1.

It may be understood that in this embodiment of the present disclosure, the preset first model set can synchronously determine positioning confidence of the face key point when positioning the face key point, reducing a time of re-determining of the accuracy, so as to determine the accuracy and a processing speed of tracking the face key point.

A computer storage medium in this embodiment of the present disclosure may be a memory including a computer program. The computer program may be executed by a processor of a data processing apparatus, so as to complete the steps of the method in the foregoing embodiment. The computer storage medium may be a memory such as a ferroelectric random access memory (FRAM), a read-only memory (ROM), a programmable read-only memory (PROM), an erasable programmable read-only memory (EPROM), an electrically erasable programmable read-only memory (EEPROM), a flash memory, a magnetic surface memory, an optical disc, or a compact disc read-only memory (CD-ROM), or may be a device including one of the foregoing memory or any combination thereof, such as a mobile phone, a computer, a tablet device, a personal digital assistant, or the like.

The computer readable storage medium stores the computer program. When the computer program is executed by the processor, a step of the following key point positioning method is performed.

In an embodiment, when the computer program is executed by the processor, performing:

generating a target detection region for facial recognition and positioning on a target image according to a preset configuration when acquiring the target image;

inputting a first target image corresponding to the target detection region into a preset first model set and calculating a position of a first face key point and first confidence;

obtaining a second target image corresponding to the position of the first face key point in the target detection region when the first confidence is greater than or equal to a preset threshold;

inputting the second target image into the preset first model set and calculating second confidence; and determining the accuracy of the position of the first face key point according to the second confidence; and determining that the position of the first face key point is a position of a final face key point of the target image when the second confidence is greater than or equal to preset accuracy.

In an embodiment, when the computer program is executed by the processor, further performing:

the preset first model set includes: a shared branch, a key point positioning branch, and a confidence branch, where the key point positioning branch and the confidence branch are respectively cascaded to the shared branch; an input of the shared branch is an input branch of the first model set; the key point positioning branch and the confidence branch are two output branches of the first model set; and the shared branch is a data model of an image feature in a building process of the preset first model set.

In an embodiment, when the computer program is executed by the processor, further performing:

obtaining first training data for face key point positioning, the first training data including a correspondence between a face image and a pre-calibrated key point coordinate;

training a model parameter of the shared branch and the key point positioning branch according to the first training data; and training a model of the shared branch and a model of the key point positioning branch;

obtaining second training data for confidence, the second training data being a classification set of the target image;

training a model parameter of the confidence branch according to the second training data; and training a model of the confidence branch; and cascading the trained model of the key point positioning branch and the trained model of the confidence branch respectively to the model of the shared branch, to generate the preset first model set.

In an embodiment, when the computer program is executed by the processor, further performing:

inputting the first target image into the model of the shared branch, to extract a first image feature;

inputting the first image feature into the model of the key point positioning branch, to calculate the position of the first face key point; and inputting the first image feature into the model of the confidence branch, to calculate the first confidence.

In an embodiment, when the computer program is executed by the processor, further performing:

inputting the second target image into the model of the shared branch, to extract a second image feature; and inputting the second image feature into the model of the confidence branch, to calculate the second confidence.

In an embodiment, when the computer program is executed by the processor, further performing:

performing error correction on the model of the key point positioning branch and the model of the confidence branch respectively according to a preset policy; and determining a corrected model of the key point positioning branch and a corrected model of the confidence branch, for face key point positioning and confidence determining.

In an embodiment, when the computer program is executed by the processor, further performing:

determining, when the first confidence is smaller than the preset threshold, that the positioning of the position of the first face key point fails; and ending the positioning of the face key point.

A person skilled in the art should understand that the embodiments of the present disclosure may be provided as a method, a system, or a computer program product. Therefore, the present disclosure may use a form of a hardware embodiment, a software embodiment, or an embodiment combining software and hardware. Moreover, the present disclosure may use a form of a computer program product that is implemented on one or more computer-usable storage media (including but not limited to a magnetic disk storage, an optical storage, and the like) that include computer-usable program code.

The present disclosure is described with reference to flowcharts and/or block diagrams of the method, device (system), and the computer program product in the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

The foregoing descriptions are merely preferred embodiments of the present disclosure, but are not used to limit the protection scope of the present disclosure.

INDUSTRIAL PRACTICABILITY

The embodiments of the present disclosure include: generating a target detection region for facial recognition and positioning on a target image according to a preset configuration when acquiring the target image; inputting a first target image corresponding to the target detection region into a preset first model set and calculating a position of a first face key point and first confidence; obtaining a second target image corresponding to the position of the first face key point in the target detection region when the first confidence is greater than or equal to a preset threshold; inputting the second target image into the preset first model set and calculating second confidence; and determining the accuracy of the position of the first face key point according to the second confidence; and determining that the position of the first face key point is a position of a final face key point of the target image when the second confidence is greater than or equal to preset accuracy. The foregoing technology is used to implement the solutions. The terminal can synchronously determine positioning accuracy of the face key point when using the preset first model set to position the face key point and determine the accuracy of tracking the face key point when a time of subsequent re-determining of the accuracy and occupied space are reduced, thus improving a processing speed of tracking the face key point.

What is claimed is:

1. A facial key point positioning method, comprising:
at a device having one or more processors, a camera and memory:
capturing, using the camera, a first target image;
generating a target detection region for facial recognition on the first target image according to a preset configuration;
displaying the target detection region for facial recognition at a location in a field of view of the camera represented in a user interface of an image capturing application associated with the camera;
in accordance with a determination that the first target image is captured, providing a single input of a portion of the first target image within the target detection region to an input layer of a preset first model set;
calculating, using the preset first model set, positions of a first set of face key points and a first confidence value, wherein the first set of face key points and the first confidence value are output by the preset first model set for the single input of the portion of the first target image into the preset first model set;
in accordance with a determination that the first confidence value meets a first preset threshold, the first preset threshold corresponds to whether the first target image is a face image:
obtaining, using the camera, a second target image corresponding to the positions of the first set of face key points in the target detection region to determine a difference between the first target image and the second target image;

inputting the second target image into the preset first model set to calculate a second confidence value, wherein the second confidence value corresponds to an accuracy of the positions of the first set of face key points in the first target image, and the second confidence value is used for indicating whether and how the device is to be adjusted to minimize the difference between the first target image and the second target image; and in accordance with a determination that the second confidence value meets a second preset threshold, outputting the positions of the first set of face key points as final face key points of the first target image in the user interface, wherein a building process for the preset first model set includes:

obtaining first training data for face key point positioning, the first training data comprising pair-wise correspondences between face images and respective sets of pre-calibrated key point coordinates; and obtaining second training data for confidence, the second training data being a classification set of previously acquired target images, the classification set includes labels of facial recognition for face images and non-face or abnormal face images.

2. The method according to claim 1, wherein the preset first model set comprises a shared branch, a key point positioning branch, and a confidence branch, wherein the key point positioning branch and the confidence branch are respectively cascaded from the shared branch, an input of the shared branch is an input branch of the preset first model set; the key point positioning branch and the confidence branch are two output branches of the preset first model set, and the shared branch is an image feature data model in the building process of the preset first model set.

3. The method according to claim 2, wherein the building process of the preset first model set includes:

training model parameters of the shared branch and the key point positioning branch according to the first training data to obtain a model of the shared branch and a model of the key point positioning branch at the same time;

training model parameters of the confidence branch according to the second training data to obtain a model of the confidence branch; and connecting the trained model of the key point positioning branch and the trained model of the confidence branch respectively to the model of the shared branch, to generate the preset first model set.

4. The method according to claim 3, wherein providing a portion of the first target image within the target detection region to an input layer of a preset first model set to calculate positions of a first set of face key points and a first confidence value comprises:

inputting the portion of the first target image into the model of the shared branch, to extract first image features;

inputting the first image features into the model of the key point positioning branch, to calculate the positions of the first face key points; and inputting the first image features into the model of the confidence branch, to calculate the first confidence value.

5. The method according to claim 3, wherein inputting the second target image into the preset first model set to calculate a second confidence value comprises:

inputting the second target image into the model of the shared branch, to extract second image features; and inputting the second image features into the model of the confidence branch, to calculate the second confidence value.

6. The method according to claim 3, including:

before training the model of the key point positioning branch and the model of the confidence branch:

performing error correction on the model of the key point positioning branch and the model of the confidence branch respectively according to a preset policy; and determining a corrected model of the key point positioning branch and a corrected model of the confidence branch, for face key point positioning and confidence determining.

7. The method according to claim 1, including:

after calculating the positions of the first face key points and the first confidence value:

determining, in accordance with a determination that the first confidence value does not meet the first preset threshold, that the positioning of the positions of the first face key points fails; and ending the positioning of the face key points based on the first target image.

8. A device, comprising:

one or more processors;

memory;

a camera a display; and a plurality of instructions stored in the memory that, when executed by the one or more processors, cause the one or more processors to perform the following operations:

capturing, using the camera, a first target image;

generating a target detection region for facial recognition on the first target image according to a preset configuration;

displaying the target detection region for facial recognition at a location in a field of view of the camera represented in a user interface of an image capturing application associated with the camera;

in accordance with a determination that the first target image is captured, providing a single input of a portion of the first target image within the target detection region to an input layer of a preset first model set;

calculating, using the preset first model set, positions of a first set of face key points and a first confidence value, wherein the first set of face key points and the first confidence value are output by the preset first model set for the single input of the portion of the first target image into the preset first model set;

in accordance with a determination that the first confidence value meets a first preset threshold, the first preset threshold corresponds to whether the first target image is a face image:

obtaining, using the camera, a second target image corresponding to the positions of the first set of face key points in the target detection region to determine a difference between the first target image and the second target image;

inputting the second target image into the preset first model set to calculate a second confidence value, wherein the second confidence value corresponds to an accuracy of the positions of the first set of face key points in the first target image, and the second confidence value is used for indicating whether and how the device is to be adjusted to minimize the difference between the first target image and the second target image; and in accordance with a determination that the second confidence value meets a second preset threshold, outputting the positions of the first set of face key points as final face key points of the first target image in the user interface, wherein a building process for the preset first model set includes:

obtaining first training data for face key point positioning, the first training data comprising pair-wise correspondences between face images and respective sets of pre-calibrated key point coordinates; and obtaining second training data for confidence, the second training data being a classification set of previously acquired target images, the classification set includes labels of facial recognition for face images and non-face or abnormal face images..

9. The device according to claim 8, wherein the preset first model set comprises a shared branch, a key point positioning branch, and a confidence branch, wherein the key point positioning branch and the confidence branch are respectively cascaded from the shared branch, an input of the shared branch is an input branch of the preset first model set; the key point positioning branch and the confidence branch are two output branches of the preset first model set, and the shared branch is an image feature data model in the building process of the preset first model set.

10. The device according to claim 9, wherein the building process of the preset first model set includes:

training model parameters of the shared branch and the key point positioning branch according to the first training data to obtain a model of the shared branch and a model of the key point positioning branch at the same time;

training model parameters of the confidence branch according to the second training data to obtain a model of the confidence branch; and connecting the trained model of the key point positioning branch and the trained model of the confidence branch respectively to the model of the shared branch, to generate the preset first model set.

11. The device according to claim 10, wherein providing a portion of the first target image within the target detection region to an input layer of a preset first model set to calculate positions of a first set of face key points and a first confidence value comprises:

inputting the portion of the first target image into the model of the shared branch, to extract first image features;

inputting the first image features into the model of the key point positioning branch, to calculate the positions of the first face key points; and inputting the first image features into the model of the confidence branch, to calculate the first confidence value.

12. The device according to claim 10, wherein inputting the second target image into the preset first model set to calculate a second confidence value comprises:

inputting the second target image into the model of the shared branch, to extract second image features; and inputting the second image features into the model of the confidence branch, to calculate the second confidence value.

13. The device according to claim 10, wherein the operations include:

before training the model of the key point positioning branch and the model of the confidence branch:

performing error correction on the model of the key point positioning branch and the model of the confidence branch respectively according to a preset policy; and determining a corrected model of the key point positioning branch and a corrected model of the confidence branch, for face key point positioning and confidence determining.

14. The device according to claim 8, wherein the operations include:

after calculating the positions of the first face key points and the first confidence value:

determining, in accordance with a determination that the first confidence value does not meet the first preset threshold, that the positioning of the positions of the first face key points fails; and ending the positioning of the face key points based on the first target image.

15. A non-transitory computer-readable storage medium storing a plurality of instructions configured for execution by a device having one or more processors, a camera, and a display, wherein the plurality of instructions cause the device to perform the following operations:

capturing, using the camera, a first target image;

generating a target detection region for facial recognition on the first target image according to a preset configuration;

displaying the target detection region for facial recognition at a location in a field of view of the camera represented in a user interface of an image capturing application associated with the camera;

in accordance with a determination that the first target image is captured, providing a single input of a portion of the first target image within the target detection region to an input layer of a preset first model set;

calculating, using the preset first model set, positions of a first set of face key points and a first confidence value, wherein the first set of face key points and the first confidence value are output by the preset first model set for the single input of the portion of the first target image into the preset first model set;

in accordance with a determination that the first confidence value meets a first preset threshold, the first preset threshold corresponds to whether the first target image is a face image:

obtaining, using the camera, a second target image corresponding to the positions of the first set of face key points in the target detection region to determine a difference between the first target image and the second target image;

inputting the second target image into the preset first model set to calculate a second confidence value, wherein the second confidence value corresponds to an accuracy of the positions of the first set of face key points in the first target image, and the second confidence value is used for indicating whether and how the device is to be adjusted to minimize the difference between the first target image and the second target image; and in accordance with a determination that the second confidence value meets a second preset threshold, outputting the positions of the first set of face key points as final face key points of the first target image in the user interface, wherein a building process for the preset first model set includes:

obtaining first training data for face key point positioning, the first training data comprising pairwise correspondences between face images and respective sets of pre-calibrated key point coordinates; and obtaining second training data for confidence, the second training data being a classification set of previously acquired target images, the classification set includes labels of facial recognition for face images and non-face or abnormal face images.

16. The non-transitory computer-readable medium of claim 15, wherein the preset first model set comprises a shared branch, a key point positioning branch, and a confidence branch, wherein the key point positioning branch and the confidence branch are respectively cascaded from the shared branch, an input of the shared branch is an input branch of the preset first model set; the key point positioning branch and the confidence branch are two output branches of the preset first model set, and the shared branch is an image feature data model in the building process of the preset first model set.

17. The non-transitory computer-readable medium of claim 16, wherein the building process of the preset first model set includes:

training model parameters of the shared branch and the key point positioning branch according to the first training data to obtain a model of the shared branch and a model of the key point positioning branch at the same time;

training model parameters of the confidence branch according to the second training data to obtain a model of the confidence branch; and connecting the trained model of the key point positioning branch and the trained model of the confidence branch respectively to the model of the shared branch, to generate the preset first model set.

18. The non-transitory computer-readable medium of claim 17, wherein providing a portion of the first target image within the target detection region to an input layer of a preset first model set to calculate positions of a first set of face key points and a first confidence value comprises:

inputting the portion of the first target image into the model of the shared branch, to extract first image features;

inputting the first image features into the model of the key point positioning branch, to calculate the positions of the first face key points; and inputting the first image features into the model of the confidence branch, to calculate the first confidence value.

19. The non-transitory computer-readable medium of claim 18, wherein inputting the second target image into the preset first model set to calculate a second confidence value comprises:

inputting the second target image into the model of the shared branch, to extract second image features; and inputting the second image features into the model of the confidence branch, to calculate the second confidence value.

20. The non-transitory computer-readable medium of claim 18, wherein the operations include:

before training the model of the key point positioning branch and the model of the confidence branch:

performing error correction on the model of the key point positioning branch and the model of the confidence branch respectively according to a preset policy; and determining a corrected model of the key point positioning branch and a corrected model of the confidence branch, for face key point positioning and confidence determining.

* * * * *